United States Patent
Han et al.

(10) Patent No.: US 12,051,038 B2
(45) Date of Patent: Jul. 30, 2024

(54) ORDER PROCESSING METHOD, APPARATUS AND DEVICE, AND STORAGE MEDIUM

(71) Applicant: BEIJING GEEKPLUS TECHNOLOGY CO., LTD., Beijing (CN)

(72) Inventors: Hao Han, Beijing (CN); Wei Chen, Beijing (CN); Kai Sun, Beijing (CN); Yu Wang, Beijing (CN); Mo Shen, Beijing (CN)

(73) Assignee: BEIJING GEEKPLUS TECHNOLOGY CO., LTD., Beijing (CN)

(*) Notice: Subject to any disclaimer, the term of this patent is extended or adjusted under 35 U.S.C. 154(b) by 458 days.

(21) Appl. No.: 17/419,724

(22) PCT Filed: Dec. 26, 2019

(86) PCT No.: PCT/CN2019/128557
§ 371 (c)(1),
(2) Date: Jun. 30, 2021

(87) PCT Pub. No.: WO2020/140818
PCT Pub. Date: Jul. 9, 2020

(65) Prior Publication Data
US 2022/0051178 A1    Feb. 17, 2022

(30) Foreign Application Priority Data
Dec. 30, 2018 (CN) .................... 201811644266.4
Feb. 2, 2019 (CN) .................... 201910107025.4

(51) Int. Cl.
G06Q 10/087    (2023.01)
G05B 19/4155    (2006.01)

(52) U.S. Cl.
CPC ....... *G06Q 10/087* (2013.01); *G05B 19/4155* (2013.01); *G05B 2219/50391* (2013.01)

(58) Field of Classification Search
CPC .............. G06Q 10/087; G05B 19/4155; G05B 2219/50391; B65G 1/1378
See application file for complete search history.

(56) References Cited

U.S. PATENT DOCUMENTS

| | | | |
|---|---|---|---|
| 2008/0071418 A1* | 3/2008 | Antony | G06Q 10/087 700/214 |
| 2009/0138383 A1* | 5/2009 | Alba | G06Q 20/20 705/28 |

(Continued)

FOREIGN PATENT DOCUMENTS

| | | |
|---|---|---|
| CN | 101251859 A | 8/2008 |
| CN | 102254028 A | 11/2011 |

(Continued)

OTHER PUBLICATIONS

Li, Jiaxi, Mohsen Moghaddam, and Shimon Y. Nof. "Dynamic storage assignment with product affinity and ABC classification—a case study." The International Journal of Advanced Manufacturing Technology 84 (2016): 2179-2194. (Year: 2016).*

(Continued)

*Primary Examiner* — Nathan A Mitchell
(74) *Attorney, Agent, or Firm* — Bayramoglu Law Offices LLC

(57) ABSTRACT

Disclosed are an order processing method, apparatus and device, and a storage medium. The method comprises: determining a logical partition to which a target order belongs from a plurality of logical partitions as a target logical partition, wherein one logical partition is associated with at least one station and a plurality of inventory containers, and at least one inventory container of a plurality of inventory containers associated with the target logical par- (Continued)

tition accommodates inventory items required by the target order; allocating the target order to a station associated with the target logical partition, and taking the station as a target station; and controlling a robot to carry a target inventory container, accommodating the inventory items required by the target order, of the plurality of inventory containers associated with the target logical partition to the target station.

21 Claims, 8 Drawing Sheets

(56) References Cited

U.S. PATENT DOCUMENTS

| | | | |
|---|---|---|---|
| 2012/0317059 | A1* | 12/2012 | Joshi .................. G06Q 10/06 |
| | | | 706/45 |
| 2013/0226649 | A1* | 8/2013 | Grissom .......... G06Q 10/06315 |
| | | | 705/7.25 |
| 2014/0100715 | A1 | 4/2014 | Mountz et al. |
| 2016/0145045 | A1 | 5/2016 | Mountz et al. |
| 2017/0330259 | A1* | 11/2017 | Deshpande ........ G06Q 30/0639 |
| 2018/0012153 | A1 | 1/2018 | Hu et al. |
| 2019/0266552 | A1* | 8/2019 | Gupta ............... G06Q 30/0201 |
| 2019/0272491 | A1* | 9/2019 | Das .................. G06Q 10/06313 |
| 2019/0347607 | A1* | 11/2019 | Shi .......................... G06N 7/01 |
| 2020/0005226 | A1* | 1/2020 | Sikka .................. G06Q 10/087 |
| 2020/0103882 | A1* | 4/2020 | Sullivan ..................... B66F 9/07 |
| 2022/0398528 | A1* | 12/2022 | Gupta ................... G06Q 50/28 |

FOREIGN PATENT DOCUMENTS

| | | | |
|---|---|---|---|
| CN | 105469237 | A | 4/2016 |
| CN | 106228302 | A | 12/2016 |
| CN | 106311615 | A | 1/2017 |
| CN | 106384219 | A | 2/2017 |
| CN | 106446943 | A | 2/2017 |
| CN | 106886524 | A | 6/2017 |
| CN | 106919921 | A | 7/2017 |
| CN | 107016583 | A | 8/2017 |
| CN | 206622328 | U | 11/2017 |
| CN | 107545381 | A | 1/2018 |
| CN | 107944782 | A | 4/2018 |
| CN | 107944896 | A | 4/2018 |
| CN | 108053268 | A | 5/2018 |
| CN | 108182621 | A | 6/2018 |
| CN | 108388651 | A | 8/2018 |
| CN | 108502435 | A | 9/2018 |
| CN | 108898459 | A | 11/2018 |
| CN | 108932598 | A | 12/2018 |
| CN | 109214730 | A | 1/2019 |
| DE | 29723878 | U1 | 8/1999 |
| EP | 1400932 | A1 | 3/2004 |
| JP | H1159817 | A | 3/1999 |
| JP | 2009205365 | A | 9/2009 |

OTHER PUBLICATIONS

Youhong Lu, Design of control and management system for logistics-intensive warehouse, Computer Era, 2009, pp.34-38, No. 3.

Cao Huangjin, et al., Inventory management model and sensitivity analysis for stochastic demand, J Tsinghua Univ (Sci &Tech), 2012, pp. 1513-1517, vol. 52 No. 11.

Zhaoyi Wang, et al., Analysis of E-commerce Website User Behavior Based on K-MEANS Cluster, Journal of Wenzhou University (Natural Science Edition), 2017, pp. 49-54, vol. 38 No. 3.

Hong Wen-Xing, et al., Hybrid recommender system for vertical e-commerce website, Systems Engineering Theory & Practice, 2010, pp. 928-935, vol. 30 No.5.

Lu Guifu, et al., Uncorrelated kernel extension of graph embedding, Journal of Image and Graphics, 2011, pp. 618-624, vol. 16 No. 4.

Xie Gui-Lin, et al., Factorization Machine Recommendation System Based on Cluster Algorithm, Computer Engineering & Software, 2016, pp. 113-117, vol. 37 No. 10.

* cited by examiner

ORDER PROCESSING METHOD, APPARATUS AND DEVICE, AND STORAGE MEDIUM

CROSS REFERENCES TO THE RELATED APPLICATIONS

The present application is a US National Stage of International Application No. PCT/CN2019/128557, filed Dec. 26, 2019, which claims the priorities from Chinese Patent Application No. 201811644266.4, filed Dec. 30, 2018, and Chinese Patent Application No. 201910107025.4, filed Feb. 2, 2019, which are hereby incorporated by reference in their entireties.

TECHNICAL FIELD

Embodiments of the present application relate to the technical field of warehousing and logistics, for example, to an order processing method and apparatus, a device, and a storage medium.

BACKGROUND

An inventory system in the warehousing and logistics industry can meet the needs of regular stock-in, stock-out, order picking and count operations in a warehouse. For example, a robotic inventory system, which is an intelligent inventory system based on clustered robots and modular shelves, is highly flexible and can achieve fast warehouse construction and relocation with small cost, and thus is widely used in the warehousing and logistics industry.

As the area of warehouse based on robotic picking continues to increase, the average transfer distance for a robot to carry a unit task becomes progressively longer, and the marginal cost of robotic picking continues to rise. For inventory management, certain items with same attributes are stored together in a specific physical area. Based on this point, there is a need for effective partition management and a management process for a robotic picking warehouse. In an order processing process in the related technology, partition management of physical partitions is usually adopted to implement the order processing process. The so-called physical partition means that items are fixedly stored in a corresponding partition and cannot be stored in other physical partitions. When an order is processed, for example, when order picking is performed based on the order, items are picked from physical partitions in which the items in the order are fixedly stored, and items cannot be picked from other physical partitions.

As traditional physical partitioning is low in intelligence and flexibility, while an inventory system is characterized by its flexibility and high compliance, the robotic inventory system cannot give full play to its flexibility and high compliance based on physical partitioning, thus failing to provide higher robot utilization and improve the order processing efficiency of the system.

SUMMARY

An order processing method and apparatus, a device, and a storage medium are provided in embodiments of the present application to provide higher robot utilization and improve the order processing efficiency of a system.

In an embodiment, the embodiment of the present application provides an order processing method, including:

determining a logical partition to which a target order belongs from a plurality of logical partitions as a target logical partition, wherein one logical partition is associated with at least one operating position and a plurality of inventory containers, and at least one of a plurality of inventory containers associated with the target logical partition contains an item required for the target order;

assigning the target order to an operating position associated with the target logical partition as a target operating position; and controlling a robot to transfer a target inventory container that contains items required for the target order, of the plurality of inventory containers associated with the target logical partition, to the target operating position.

In an embodiment, the embodiment of the present application further provides an order processing apparatus, including:

a target partition determination module configured to determine a logical partition to which a target order belongs from a plurality of logical partitions as a target logical partition, wherein one logical partition is associated with at least one operating position and a plurality of inventory containers, and at least one of a plurality of inventory containers associated with the target logical partition contains an item required for the target order;

a target order assignment module configured to assign the target order to an operating position associated with the target logical partition as a target operating position; and a target order processing module configured to control a robot to transfer a target inventory container that contains an item required for the target order, of the plurality of inventory containers associated with the target logical partition, to the target operating position.

In an embodiment, the embodiment of the present application further provides a device, including:
one or more processors; and
storage means configured to store one or more programs, wherein
the one or more programs are executed by the one or more processors to cause the one or more processors to implement the method of any embodiment of the present application.

In an embodiment, the embodiment of the present application further provides a computer-readable storage medium, which stores a computer program that, when executed by a processor, implements the method of any embodiment of the present application.

DETAILED DESCRIPTION OF THE EMBODIMENTS

Figure 1A:
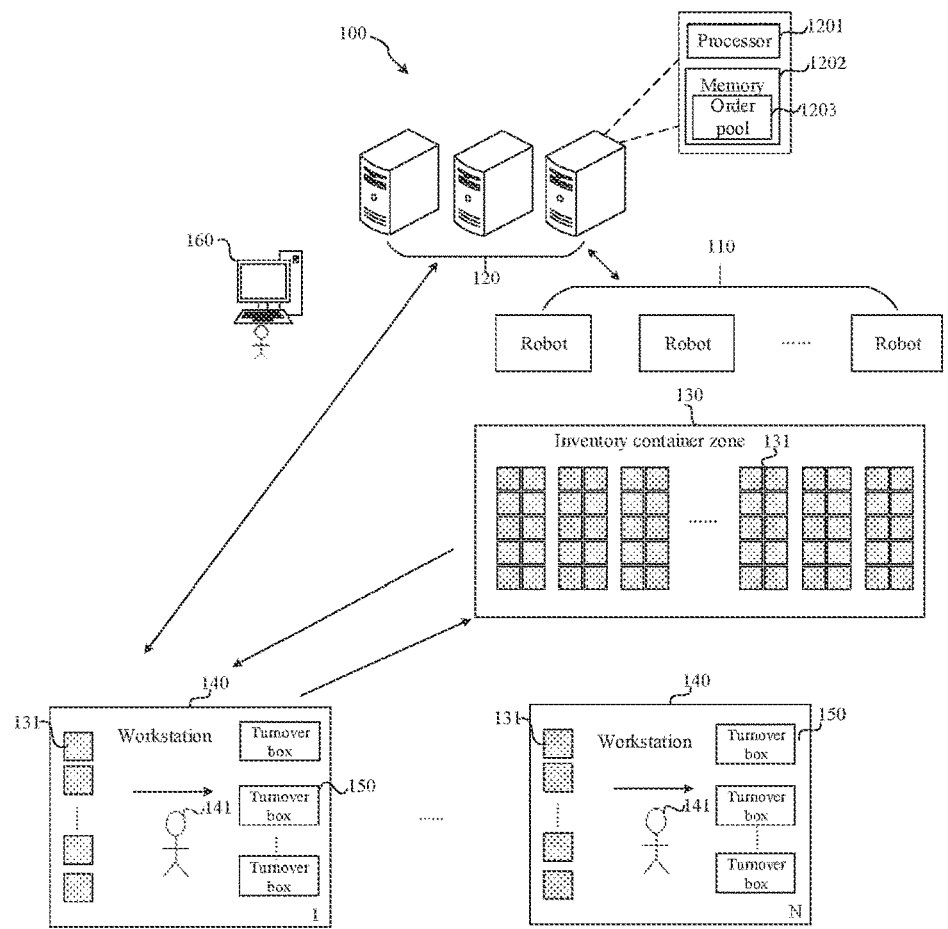
FIG. 1A is a structural diagram of an inventory system provided in embodiments of the present application.

The present application is described in detail below in conjunction with the accompanying drawings and embodiments. It may be understood that the specific embodiments described herein are only used for explaining the present application, rather than limiting the present application. For convenience of description, only parts related to the present application, instead of the entire structure, are shown in the drawings.

Before exemplary embodiments are discussed in more detail, it should be mentioned that some of the exemplary embodiments are described as processes or methods illustrated in flow charts. Although multiple operations (or steps) are described as processed sequentially in the flow charts, many of the operations may be performed in parallel, concurrently, or simultaneously. In addition, the sequence of multiple operations may be changed by rearrangement. The processes may be terminated when the operations are completed, but additional steps not included in the drawings may also be performed. The processes may correspond to methods, functions, procedures, subroutines, subroutines, etc.

FIG. 1A is a structural diagram of an inventory system provided in an embodiment of the present application. Referring to FIG. 1A, the inventory system 100 may include: robots 110, a control system 120, an inventory container zone 130, and workstations 140. The inventory container zone 130 is provided with a plurality of inventory containers 131. Various items may be placed on the inventory containers 131, like shelves with various items placed thereon as seen in a supermarket. As an alternative solution, bins or pallets or other item carrying means may also be placed on the inventory containers 131, with one or more types of items contained in the item carrying means; and the plurality of inventory containers 131 are arranged in an array. Generally, a plurality of workstations 140 may be provided on an edge of the inventory container zone 130.

The control system 120 communicates with the robots 110 wirelessly, and a working person may use an operation console 160 to operate the control system 120, and each robot 110 may perform a task of transferring an inventory container under the control of the control system 120. The inventory container may include a movable inventory container, and the robot 110 may be an automatic guided robot. Using a movable inventory container as an example of the inventory container 131, for example, the movable inventory container may be a movable shelf, and the robot 110 may travel along an empty space (a part of a passageway of the robot 110) in array of movable shelf, move to the bottom of the shelf, lift the shelf by using a lifting mechanism, and transfer it to an allocated workstation 140.

In an example, the robot 110 may have a lifting mechanism or hooking structure, and a positioning and navigation function. The robot 110 can travel to the bottom of the inventory container 131, and lift the entire inventory container 131 by using the lifting mechanism or pull the entire inventory container 131 by using the hooking structure, so that the inventory container 131 can move up and down with the lifting mechanism having a lifting function or be pulled with the hooking structure.

In another example, the robot 110 can travel forward according to two-dimensional code information captured by a camera, and can travel to the underside of the inventory container 131 prompted by the control system 120 according to a path determined by the control system 120. The robot 110 transfers the inventory container 131 to a workstation 140, and a working person 141 or automated equipment (e.g., robotic arm) at the workstation 140 performs multiple types of inventory operations on the inventory container 131; including: a picking, stock-taking, or replenishing operation. Using a picking operation as an example, the working person 141 or other automated equipment picks an item from the inventory container 131 and places it into a turnover box 150 to wait for packing.

Figure 1B:
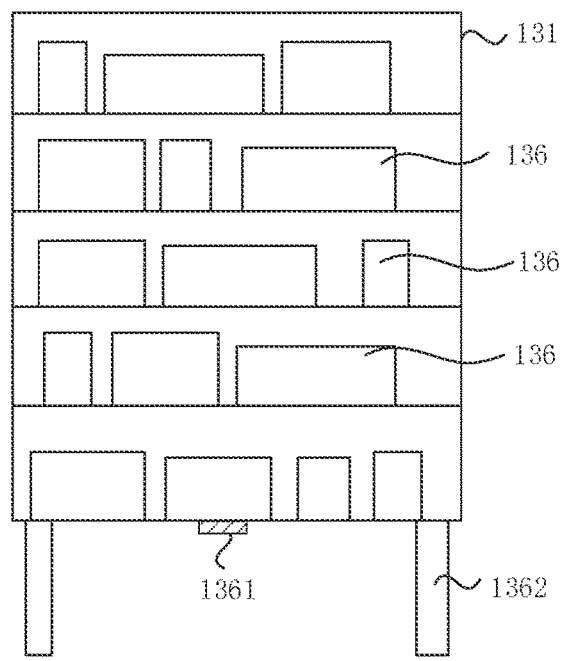
FIG. 1B is a structural diagram of a shelf provided in embodiments of the present application.

Using a shelf as an example of the storage container 131, FIG. 1B is a structural diagram of a shelf provided in an embodiment of the present application. As shown in FIG. 1B, the shelf 131 includes a plurality of partition layers and four floor-standing support columns 1362, and multiple types of items 136 may be placed directly on the partition layers of the shelf. In a particular embodiment, the items 136 may be suspended from a hook or rod in or on the shelf, and the items 136 can be placed inside or on an outer surface of the shelf in multiple suitable manners.

The partition layers of the shelf may also be provided with a plurality of bins, which may be separated from the shelf, or integrated with the shelf, and one or more items may be placed in the bins. Furthermore, the shelf may be a shelf open on two sides, and two items may be placed along the depth direction of each partition layer, which means that one item is placed in each open direction, or two bins are placed along the depth direction of each partition layer, which means that one bin is placed in each open direction. The shelf may also be a shelf open on one side (FIG. 1B shows a shelf open on one side), and one item may be placed along the depth direction of each partition layer, which means that one item is placed in the side with the open, or one bin is placed along the depth direction of each partition layer, which means that one bin is placed in the side with the open.

Figure 1C:
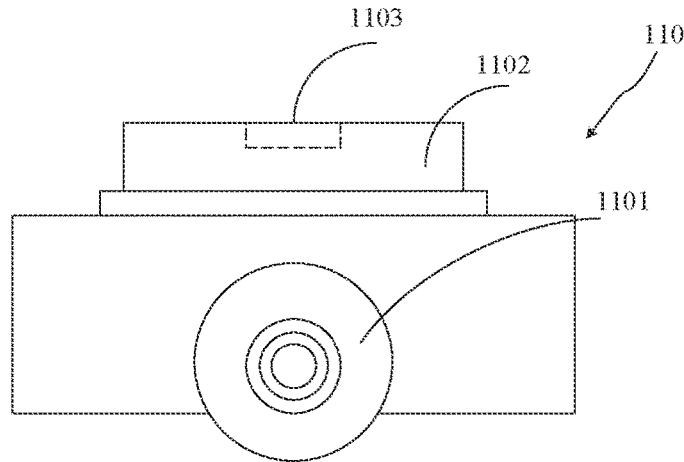
FIG. 1C is a structural diagram of a robot provided in embodiments of the present application.

FIG. 1C is a structural diagram of a robot provided in an embodiment of the present application. As shown in FIGS. 1A and 1C, in an example, the automatic guided robot 110 may include a driving mechanism 1101, by means of which the automatic guided robot 110 can move within a working space, and the automatic guided robot 110 may further include a lifting mechanism 1102 for carrying a shelf, and the automatic guided robot 110 may move to be under of a target shelf 131, lift the target shelf 131 by using the lifting mechanism 1102, and carry it to an assigned workstation 140. When the lifting mechanism 1102 rises, the entire target shelf 131 is lifted from the ground, so that the automatic guided robot 110 transfers the target shelf 131, and when the lifting mechanism 1102 falls, the target shelf 131 is placed onto the ground. A target identifying component 1103 of the automatic guided robot 110 can effectively identify the target shelf 131 when the automatic guided robot 110 lifts the target shelf 131.

In addition, if it is based on two-dimensional code navigation, the automatic guided robot 110 further includes a navigation identification component (not shown in FIG. 1C), which is configured to identify a two-dimensional code mark provided on the ground. In addition to the two-dimensional code navigation, the automatic guided robot 110 may also adopt other navigation mode, such as inertial navigation, or simultaneous localization and mapping (SLAM) navigation, or adopt a combination of two or more navigation modes, such as two-dimensional code navigation and inertial navigation, or SLAM navigation and two-dimensional code navigation. Of course, the automatic guided robot 110 may also include a control module (not shown in FIG. 1C) that controls the entire automatic guided robot 110 to implement functions such as motion and navigation. In an example, the automatic guided robot 110 includes two cameras, one of which faces upward and the other faces downward, and can travel forward according to two-dimensional code information (or other ground identifier) captured by the downward camera, can travel to the underside of the target shelf 131 prompted by the control system 120 according to a path determined by the control system 120.

As shown in FIG. 1B, a two-dimensional code 1361 is provided at the center of the bottom of the target shelf 131. After the automatic guided robot 110 travels to be under the target shelf 131, the upward camera correctly photographs the two-dimensional code 1361 to ensure that the automatic guided robot 110 is just located right below the target shelf 131, thereby ensuring that the automatic guided robot 110 can smoothly lift and transfer the target shelf 131.

The control system 120 is a software system running on a server and having data storage and information processing capabilities, and may be connected to the robot, a hardware input system, and other software systems in a wireless or wired manner. The control system 120 may include one or more servers, and may be of a centralized control architecture or a distributed computing architecture. The server has a processor 1201 and a memory 1202, and an order pool 1203 can be provided in the memory 1202.

Using the inventory system shown in FIG. 1A as an example, physical partitioning in the related art is low in intelligence and flexibility, resulting in that order processing based on physical partitioning is poor in flexibility and high compliance, and it cannot provide a higher robot utilization rate or improve the order processing efficiency of the system. Therefore, the order processing method needs to be improved to give full play to the flexibility and high compliance of the inventory system.

An order processing method and apparatus, a device, a system, and a storage medium provided in embodiments of the present application will be described below in detail through the following embodiments.

Figure 2:
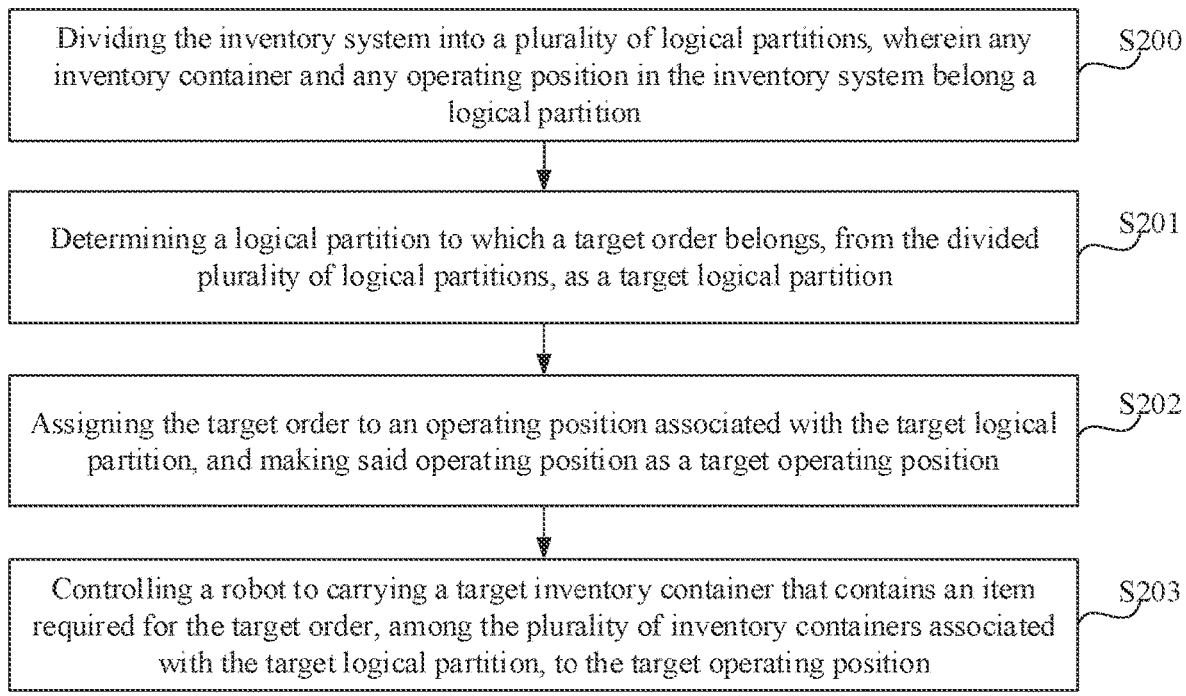
FIG. 2 is a flow chart of an order processing method provided in embodiments of the present application.

FIG. 2 is a flow chart of an order processing method provided in an embodiment of the present application. This embodiment may be applied to a scenario of processing of orders, in particular to a scenario of processing orders in an inventory system. The method may be performed by an order processing apparatus, which may be implemented in software and/or hardware, and the apparatus may be integrated in multiple types of devices with a network communication function, which may be servers with a network communication function, such as in servers for processing orders in an inventory system. As shown in FIG. 2, the order processing method provided in the embodiment of the present application may include the following.

S200: dividing the inventory system into a plurality of logical partitions, wherein any inventory container and any operating position in the inventory system belong a logical partition.

In the embodiment of the present application, the technical solution of this embodiment processes orders based on logical partitioning as opposed to the traditional solution that processes orders based on physical partitioning. In other words, with the solution of this embodiment, in processing of orders, orders are not processed based on physical partitioning, but on logical partitioning. Logical partitioning management is not traditional partitioning management of the inventory system based on physical locations, but partitioning management of the inventory system from a logical point of view.

The inventory system is provided with fixed inventory container positions, and inventory containers may be placed in the corresponding inventory container positions. Each inventory container position may only correspond to one inventory container at any time, and each inventory container can only be placed at the corresponding inventory container position. Of course, the correspondence relationship between the inventory container positions and the inventory containers may be adjusted adaptively according to positional adjustment of the inventory containers in the inventory system.

The inventory system may include a plurality of logical partitions, wherein each logical partition in the inventory system may be associated with at least one operating position in the inventory system (in an optional solution, one logical partition is associated with one operating position in the inventory system) as well as a plurality of inventory containers and a plurality of inventory container positions; the sum of the inventory containers associated with all logical partitions is at least part or even all of the inventory containers in the inventory system; and the sum of the inventory container positions associated with all logical partitions is at least part or even all of the inventory container positions in the inventory system. A logical partitioning method will be described in detail later. The inventory containers may include shelves or containers in other forms, and pallets, bins, and other item-carrying means may be placed on the shelves.

In the embodiment of the present application, in logical partitioning of the inventory system, the inventory system may be divided into logical partitions by an order processing system, and subsequent order processing may be performed based on the divided plurality of logical partitions. In addition, in logical partitioning of the inventory system, the inventory system may be divided into logical partitions by an independent logical partitioning system, and then the order processing system performs subsequent order processing based on the plurality of logical partitions divided by the independent logical partitioning system.

S201: determining a logical partition to which a target order belongs, from the divided plurality of logical partitions, as a target logical partition.

In the embodiment of the present application, one logical partition may be associated with at least one operating position, and one logical partition may be associated with a plurality of inventory containers. Exemplarily, using the inventory system shown in FIG. 1A as an example, referring to FIG. 1A, the inventory system may include operating positions in the workstation 140, inventory containers in the inventory container zone 130, and the robot 110. Each logical partition in the inventory system may be associated with at least one operating position in a workstation 140, and each logical partition is associated with a plurality of inventory containers located in the inventory container zone 130. The inventory containers located in the inventory container zone 130 may be configured to store items.

In the embodiment of the present application, the target order may contain stock keeping unit (SKU) information of items. An SKU is a unit for stock-in and stock-out measurements, and may be based on pieces, boxes, pallets and the like as units. The SKU involved in the embodiment of the present application may be extended to be a short name for a unified number of items, and each type of items corresponds to a unique SKU number. The SKU may be understood as a unified number or unique identification number of items, and multiple types of items may be identified by SKUs corresponding to the plurality of items respectively. At least one of a plurality of inventory containers associated with the target logical partition contains an item required for the target order.

S202: assigning the target order to an operating position associated with the target logical partition, and making said operating position as a target operating position.

In the embodiment of the present application, given that in the inventory system, each logical partition may be associated with at least one operating position, after the target logical partition to which the target order belongs is determined, there may be a plurality of operating positions associated with the target logical partition, and any operating position may be selected therefrom as a target operating position.

S203: controlling a robot to carrying a target inventory container that contains an item required for the target order, among the plurality of inventory containers associated with the target logical partition, to the target operating position.

In the embodiment of the present application, after the target order is assigned to the target operating position associated with the target logical partition, a robot may be controlled to carry a target inventory container (i.e., an inventory container that contains an item required for the target order, of the plurality of inventory containers associated with the target logical partition) to the target operating position. In an embodiment, after the target order is assigned to the target operating position associated with the target logical partition, a transfer task is generated for the target operating position, and a robot is controlled to transfer the target inventory container from the inventory container zone to the target operating position. At the target operating position, a working staff or automated equipment may grab the item required for the target order from the target inventory container and place the same into an order container to wait for packing. Of course, in addition to an item picking operation, item replenishment, item stock-taking and other task operations may also be performed.

It may be understood that the essence of logical partitioning is to establish a many-to-many mapping relationship of storage resources of inventory containers, transport resources of robots, and operation resources of operating positions, so that a plurality of resources may be optimally matched to improve the working efficiency of the robots and speed up the processing rate of orders.

In the order processing method provided in the embodiment of the present application, the target logical partition to which the target order belongs is determined from the plurality of logical partitions in the inventory system, and when orders are pushed into the inventory system, the system assigns different orders into different logical partitions, and for each order, eventually a picking operation is performed only in the logical partition to which the order belongs. That is, the order is assigned to an operating position associated with the logical partition to which the order belongs, and an inventory container is taken to the operating position from the logical partition to which the order belongs and picking is performed there, to ensure that the sum of distances between each of a plurality of inventory containers required in picking for the order and the operating position is as short as possible, so that an average transfer distance of the robot can be reduced greatly, and the picking efficiency is improved.

A logical partitioning method will be introduced below. In the method shown in FIG. 3, logical partitioning is performed based on historical order information, while in a method shown in FIG. 4, logical partitioning is guided by established inventory. In an embodiment, if the inventory system has historical order information, logical partitioning may be performed preferably based on the historical order information; otherwise, logical partitioning is guided by established inventory. The order processing method provided in the embodiment of the present application is not limited to the following two logical partitioning methods, and other suitable logical partitioning methods may also be adopted. As a result of logical partitioning, and as a basis for order processing, the inventory system contains a plurality of logical partitions, wherein each logical partition is associated with operating positions and inventory containers in the inventory system; different logical partitions may be associated with different operating positions and different inventory containers; and the operating positions and inventory containers associated with different logical partitions may also be partially overlapped.

Figure 3:
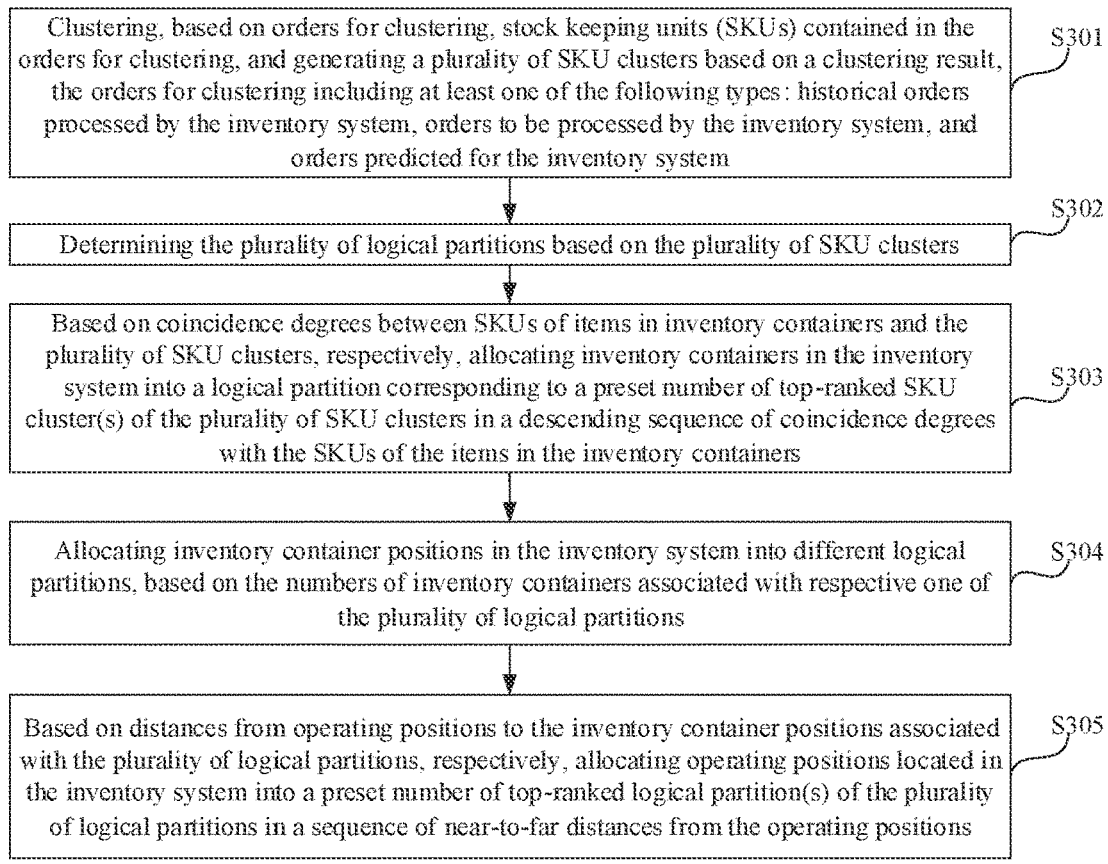
FIG. 3 is a flow chart of a logical partitioning method provided in embodiments of the present application.

FIG. 3 is a flow chart of a logical partitioning method provided in an embodiment of the present application, and the embodiment of the present application may be combined with multiple optional solutions in one or more of the above embodiments. As shown in FIG. 3, the logical partitioning method provided in the embodiment of the present application may include the following steps.

S301: clustering, based on orders for clustering, stock keeping units (SKUs) contained in the orders for clustering, and generating a plurality of SKU clusters based on a clustering result, the orders for clustering including at least one of the following types: historical orders processed by the inventory system, orders to be processed by the inventory system, and orders predicted for the inventory system.

For example, based on historical orders processed by the inventory system. SKUs contained in the historical orders are clustered, and a plurality of SKU clusters are generated based on a clustering result.

In the embodiment of the present application, for each historical order of the inventory system, the historical order may include one or more types of items, and each type of items may be set with corresponding SKU information. Thus, SKUs contained in a plurality of historical orders may be clustered based on SKU information contained in the historical orders, so that SKUs of a same cluster are gathered together into an SKU cluster, and thus a plurality of SKU clusters may be obtained based on a clustering result of the SKUs.

In the embodiment of the present application, it is not limited to clustering historical orders processed by the inventory system, and may also be clustering orders that have arrived at the inventory system but not yet been processed (i.e., orders to be processed by the inventory system), and may also be clustering orders predicted by the inventory system (e.g., orders obtained based on user behavior predictions). Different logical partitions are obtained based on different clustering processes. The "same cluster" in the above expression "SKUs of a same class are gathered together into an SKU cluster" does not mean a same type in the actual sense. Instead, the "same cluster" may be so understood that SKU information in a same SKU cluster often co-occur. For example, items with SKUs of "a same cluster" often appear in one order.

In the embodiment of the present application, given that the logical partitions of the inventory system may be updated in real time at a preset time interval, when the logical partitions of the inventory system are updated in real time, SKUs contained in historical orders of the inventory system may be clustered at regular timing and a high frequency based on the historical orders of the inventor system, and a plurality of SKU clusters may be generated based on a clustering result, so that SKU clusters associated with a plurality of logical partitions may be updated in real time based on a preset period, once a week for example.

In an embodiment, clustering may also be performed at regular batches. That is, clustering may be performed once for every batch of orders that have arrived at the inventory system but not yet been processed (e.g., orders with a large volume that do not need to form a wave task with other orders). It may be understood that each clustering process leads to a change in the clustering result, which in turn leads to a change in a logical partitioning result. In an embodiment, clustering may also be performed once for multiple batches (e.g., 3 batches) of orders that have arrived at the inventory system but not yet been processed.

In an optional implementation of this embodiment, clustering, based on orders for clustering, stock keeping units (SKUs) contained in the orders for clustering may include:

extracting, based on historical orders of the inventory system, features for each SKU contained in the historical orders, and determining correlation degrees between a plurality of SKUs according to the extracted features; and clustering the plurality of SKUs based on the correlation degrees between the plurality of SKUs to obtain a clustering result.

In this implementation, based on historical order information processed by the inventory system, features are extracted for each SKU contained in the historical orders, and SKU correlation degrees between a plurality of SKUs are determined according to the extracted features of the plurality of SKUs, and the plurality of SKUs are clustered based on the SKU correlation degrees between the plurality of SKUs, to ensure that SKUs with a high correlation degree are grouped into a same class as much as possible as an SKU cluster, and a plurality of SKU clusters may be generated based on the above method. In an implementation, an SKU correlation network may be constructed based on co-occurrence information between one SKU and other SKUs, features of each SKU are extracted based on the SKU correlation network, and correlation degrees between a plurality of SKUs included in the SKU correlation network are determined based on the extracted features, and based on the correlation degrees of the plurality of SKUs, a plurality of SKUs contained in the historical orders are clustered. Each SKU contained in the historical orders is mapped into a node in the SKU correlation network, and if any two SKUs co-occur in an order, an edge is connected between the two SKU nodes to construct the SKU correlation network between one SKU and other SKUs.

S302: determining the plurality of logical partitions based on the plurality of SKU clusters.

In the embodiment of the present application, each SKU cluster corresponds to one logical partition, or each logical partition may correspond to a plurality of SKU clusters. In an embodiment, each SKU cluster corresponds to one logical partition. After SKUs contained in historical orders of the inventory system are clustered based on the historical orders, and a plurality of SKU clusters are generated based on a clustering result, the number of partitions in the logical partitioning of the inventory system may be determined based on the generated plurality of SKU clusters, to ensure that each SKU cluster corresponds to at least one logical partition.

S303: based on coincidence degrees between SKUs of items in inventory containers and the plurality of SKU clusters, respectively, allocating inventory containers in the inventory system into a logical partition corresponding to a preset number of top-ranked SKU cluster(s) of the plurality of SKU clusters in a descending sequence of coincidence degrees with the SKUs of the items in the inventory containers.

In the embodiment of the present application, a plurality of inventory containers of the inventory system may store items with one or more types of SKUs, and SKUs of items stored on different inventory containers may differ to some degree, i.e., SKUs of items stored on different inventory containers may or may not be same, or some of the SKUs may be same and the other SKUs may be different. Thus, for each inventory container in the inventory system, SKU matching may be performed between SKUs of items stored on each inventory container and the plurality of SKU clusters respectively, and based on coincidence degrees between the SKUs of the items stored on each inventory container and SKUs in the plurality of SKU clusters, the inventory container is allocated into a logical partition corresponding to an SKU cluster with the highest coincidence degree therewith.

In the embodiment of the present application, optionally, based on coincidence degrees between SKUs of items on inventory containers and the plurality of SKU clusters, respectively, an inventory container with highest SKU coincidence degree may be allocated into a logical partition corresponding to an SKU cluster matched therewith. Optionally, a plurality of inventory containers may be sequenced based on the coincidence degrees between the SKUs of the items on inventory containers and the plurality of SKU clusters, and a preset number of top-ranked inventory containers in a descending sequence may be allocated into a logical partition corresponding to an SKU cluster matched therewith. In an embodiment, the preset number is set according to the actual situation. For example, the preset number is 1, or 2, or more.

Exemplarily, an inventory system including three inventory containers and two SKU clusters is used as an example. The three inventory containers are a first inventory container, a second inventory container, and a third inventory container. The first inventory container stores items with a first SKU, items with a second SKU, items with a third SKU, and items with a fourth SKU; the second inventory container stores items with the second SKU, items with the third SKU, and items with the fourth SKU; and the third inventory container stores items with the first SKU, items with a fifth SKU, items with a sixth SKU, and items with a seventh SKU. The two SKU clusters are an SKU cluster of a first logical partition and an SKU cluster of a second logical partition. The SKU cluster of the first logical partition includes: the first SKU, the second SKU, the third SKU, and the fourth SKU, and the SKU cluster of the second logical partition includes: the first SKU, the fifth SKU, the sixth SKU, and the seventh SKU.

From SKU information of the items stored on the above-mentioned three inventory containers and SKU information contained in the SKU cluster of the first logical partition, it can be seen that the SKUs of the items stored on the first inventory container are identical to the SKUs contained in the SKU cluster of the first logical partition, there are 3 identical SKUs between the SKUs of the items stored on the second inventory container and the SKUs contained in the SKU cluster of the first logical partition, and there is one identical SKU between the SKUs of the items stored on the third inventory container and the SKUs contained in the SKU cluster of the first logical partition. At this point, sequencing is performed based on coincidence degrees between the SKUs of the items on the three inventory containers and the SKU cluster of the first logical partition in a descending sequence to result in the first inventory container, the second inventory container, and the third inventory container in this order. Similarly, sequencing is performed based on coincidence degrees between the SKUs of the items on the three inventory containers and the SKU cluster of the second logical partition in a descending sequence to result in the third inventory container, the second inventory container, and the first inventory container in this order.

Based on the above analysis, the first inventory container with the highest coincidence degree with the SKUs contained in the SKU cluster of the first logical partition may be allocated into the first logical partition, and the third inventory container with the highest coincidence degree with the SKUs contained in the SKU cluster of the second logical partition may be allocated into the second logical partition. In addition, given that the coincidences between the SKUs of the items on the first inventory container and the SKU clusters of the first logical partition, and the SKUs of the items on the second inventory container and the SKU cluster of the first logical partition differ only in one SKU, it may consider allocating the first inventory container and the second inventory container into the first logical partition, and allocating the third inventory container into the second logical partition.

In the embodiment of the present application, SKUs of items on one or more inventory containers in the inventory system may have relatively high SKU coincidence degrees with SKUs of a plurality of SKU clusters, i.e., one or more inventory containers may be allocated to a plurality of logical partitions simultaneously. In this case, one or more inventory containers are associated with a plurality of logical partitions. It may be understood that the inventory system may contain a plurality of inventory containers and a plurality of SKU clusters, and is not limited to the limited number of inventory containers and the limited number of SKU clusters mentioned in the example.

In the embodiment of the present application, optionally, during storage of items, the items are only allowed into the logical partition to which they belong. That is, inventory containers associated with each logical partition can only store items corresponding to SKUs in the SKU cluster of the logical partition to which they belong, and generally do not store items with other SKUs than items corresponding to SKUs in the SKU cluster of the logical partition.

S304: allocating inventory container positions in the inventory system into different logical partitions, based on the numbers of inventory containers associated with respective one of the plurality of logical partitions.

In the embodiment of the present application, after a plurality of inventory containers in the inventory system are allocated into logical partitions to which the plurality of inventory containers belongs, each logical partition may be associated with at least one inventory container. Given that each inventory container position may only correspond to one inventory container at any time, and each inventory container can only be placed at the corresponding inventory container position, after a plurality of inventory containers in the inventory system are allocated into logical partitions to which the plurality of inventory containers belong, logical partitioning is further performed on inventory container positions in the inventory system. Inventory container positions in the inventory system may be allocated into different logical partitions, based on the numbers of inventory containers associated with the plurality of logical partitions. To ensure that inventory containers of a same logical partition are placed in a same location as much as possible, inventory container positions in the inventory system are allocated into different logical partitions in sequence, based on the numbers of inventory containers associated with the plurality of logical partitions, and according to a preset orientation sequence. The preset orientation sequence may be understood as a left-to-right, right-to-left, front-to-back or back-to-front orientation sequence.

Figure 4:
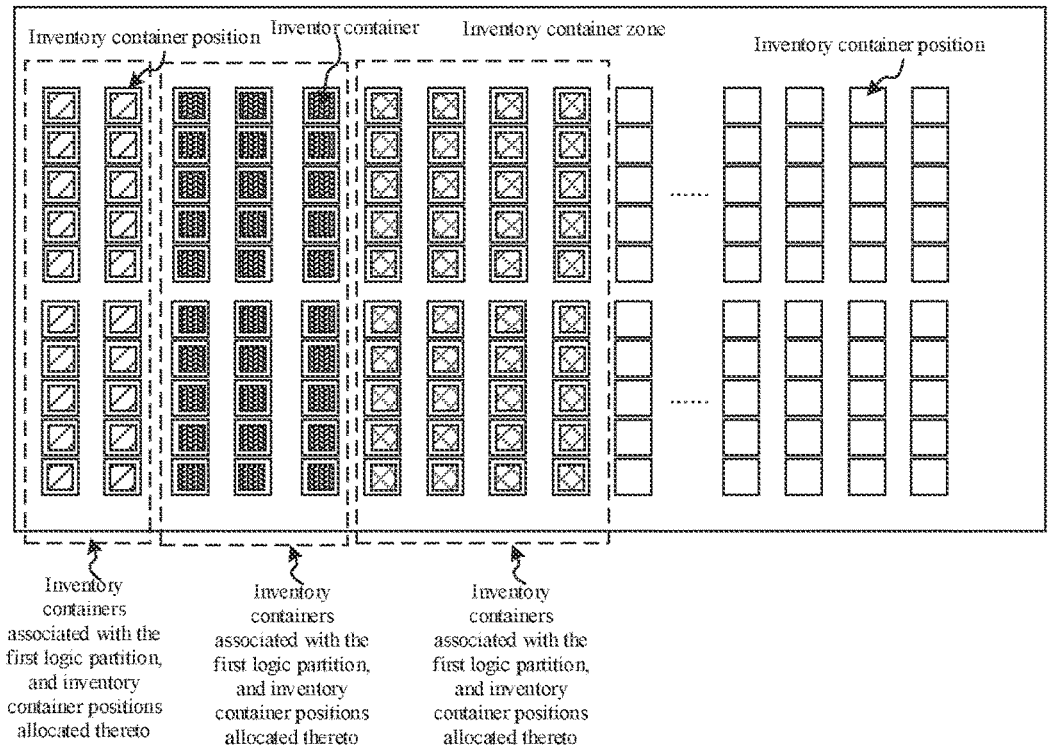
FIG. 4 is a schematic diagram of logical partitioning of inventory container positions provided in embodiments of the present application.

Exemplarily, FIG. 4 is a schematic diagram of logical partitioning of inventory container positions provided in an embodiment of the present application. Referring to FIG. 4, using an inventory system divided into a first logical partition, a second logical partition, and a third logical partition as an example, the number of inventory containers associated with the first logical partition is 20, the number of inventory containers associated with the second logical partition is 30, and the number of inventory containers associated with the third logical partition is 40; and based on the number of inventory containers associated with each logical partition, 20 inventory container positions may be allocated into the first logical partition, 30 inventory container positions may be allocated into the second logical partition, and 40 inventory container positions may be allocated into the third logical partition, according to a left-to-right orientation sequence, thus allocating inventory container positions in the inventory system into different logical partitions.

After a plurality of inventory containers and a plurality of inventory container positions are allocated into logical partitions, if an inventory container is allocated into a logical partition A, but the inventory container is currently not at an inventory container position allocated into the logical partition A, but at an inventory container position in a logical partition B, the position of the inventory container may be not adjusted immediately according to a logical partitioning result; instead, after the inventory container is transferred by a robot to an operating position to carry out a picking operation and is returned, the inventory container is placed into the inventory container position in logical partition A according to a logical partitioning result. That is, there may be a certain time delay in matching inventory containers with inventory container positions in the logical partitions.

S305: based on distances from operating positions to the inventory container positions associated with the plurality of logical partitions, respectively, allocating operating positions located in the inventory system into a preset number of top-ranked logical partition(s) of the plurality of logical partitions in a sequence of near-to-far distances from the operating positions.

In an embodiment, the preset number is set according to the actual situation. For example, the preset number is 1, or 2, or more.

In the embodiment of the present application, there may be a plurality of operating positions in the inventory system, and based on the location relationship between the plurality of operating positions and the inventory container positions associated with the plurality of logical partitions, distances from different inventory container positions to a same operating position may be not same, and distances from different operating positions to a same inventory container position may also be not same. Thus, based on distances from each operating position to the inventory container positions associated with the plurality of logical partitions, an operating position located in the inventory system may be allocated into a logical partition at the shortest distance therefrom, to ensure that distances from the plurality of operating positions to the inventory container positions in the plurality of logical partitions are as short as possible. In this way, when a robot is controlled to transfer an inventory container at an inventory container position to an operating position, it can ensure that both the operating position and the inventory container belong to a same associated logical partition, and that a distance between the operating position and the inventory container is as short as possible, thereby reducing a transfer distance for the robot.

In this embodiment, optionally, for each operating position located in the inventory system, distances from each operating position to the inventory container positions associated with the plurality of logical partitions are calculated, a logical partition associated with an inventory container position at the closest distance from the operating position located in the inventory system is determined from the logical partitions, and the operating position located in the inventory system is allocated into the logical partition at the closest distance. Optionally, for each operating position located in the inventory system, distances from each operating position to the inventory container positions associated with the plurality of logical partitions are calculated, the obtained plurality of distances are sequenced to determine a preset number of top-ranked logical partition(s) in a near-to-far sequence, and the operating position located in the inventory system is allocated into the preset number of top-ranked logical partition(s).

In the embodiment of the present application, optionally, based on distances from operating positions to the inventory container positions associated with the plurality of logical partitions, respectively, allocating operating positions located in the inventory system into a preset number of top-ranked logical partition(s) of the plurality of logical partitions in a sequence of near-to-far distances from the operating positions includes: based on the location relationship between the plurality of inventory container positions associated with the plurality of logical partitions and the plurality of operating positions, calculating a first transport distance to the plurality of operating positions from each of the inventory container positions associated with the plurality of logical partitions, and calculating a second transport distance to the inventory container positions associated with the plurality of logical partitions from each operating position; and allocating the operating positions located in the inventory system into logical partitions closest thereto based on the first transport distance and the second transport distance.

After logical partitioning is performed based on the above method, in processing of a target order, a logical partition to which the target order belongs is determined from the plurality of logical partitions as a target logical partition, wherein one logical partition is associated with at least one operating position and a plurality of inventory containers, and at least one of the plurality of inventory containers associated with the target logical partition contains the item required for the target order; and a subsequent process of order processing is performed.

In an optional implementation of the embodiment of the present application, determining a logical partition to which a target order belongs from a plurality of logical partitions as a target logical partition may include:

based on coincidence degrees between SKUs in the target order and the SKU clusters, determining a logical partition corresponding to a preset number of top-ranked SKU cluster(s) in a descending sequence of the coincidence degrees, as the target logical partition.

In this implementation, items may be stored on inventory containers at the locations of the inventory container positions associated with the plurality of logical partitions, and given that the plurality of logical partitions of the inventory system are generated based on a plurality of SKU clusters, each SKU cluster corresponding to one logical partition, SKUs of items stored on inventory containers at the inventory container positions associated with different logical partitions differ to some degree. Thus, based on the SKUs in the target order and SKUs contained in the SKU clusters corresponding to the plurality of logical partitions, coincidence degree matching may be performed between the SKUs in the target order and SKUs contained in the plurality of SKU clusters, and a logical partition corresponding to an SKU cluster with a high coincidence degree with the SKUs in the target order may be determined as the target logical partition.

Exemplarily, the SKUs in the target order are a first SKU, a second SKU, a third SKU, a fourth SKU, a fifth SKU, and a sixth SKU; SKUs contained in the SKU cluster associated with the first logical partition are the first SKU, the second SKU, and the third SKU; SKUs contained in the SKU cluster associated with the second logical partition are the third SKU, the fourth SKU, the fifth SKU, and the sixth SKU; and SKUs contained in the SKU cluster associated with the third logical partition are the first SKU, the second SKU, the third SKU, the fourth SKU, the fifth SKU, and the sixth SKU. It can be seen the SKUs contained in the SKU cluster associated with the third logical partition have the highest coincidence degree with the SKUs in the target order, and the third logical partition may be determined as the target logical partition. This has the advantage of avoiding that when robots are controlled to transfer inventory containers, it needs to carry inventory containers in two logical partitions at the same time to meet SKU conditions in the target order, which reduces the transfer efficiency for the robot, and thus reduces the order processing efficiency of the entire inventory system.

In this implementation, optionally, coincidence degrees between the SKUs in the target order and the SKU clusters may be determined, and the SKU clusters are sequenced in a descending sequence based on the coincidence degrees between the SKUs in the target order and the SKU clusters, and a logical partition corresponding to a preset number of top-ranked SKU cluster(s) is determined as the target logical partition.

Figure 5:
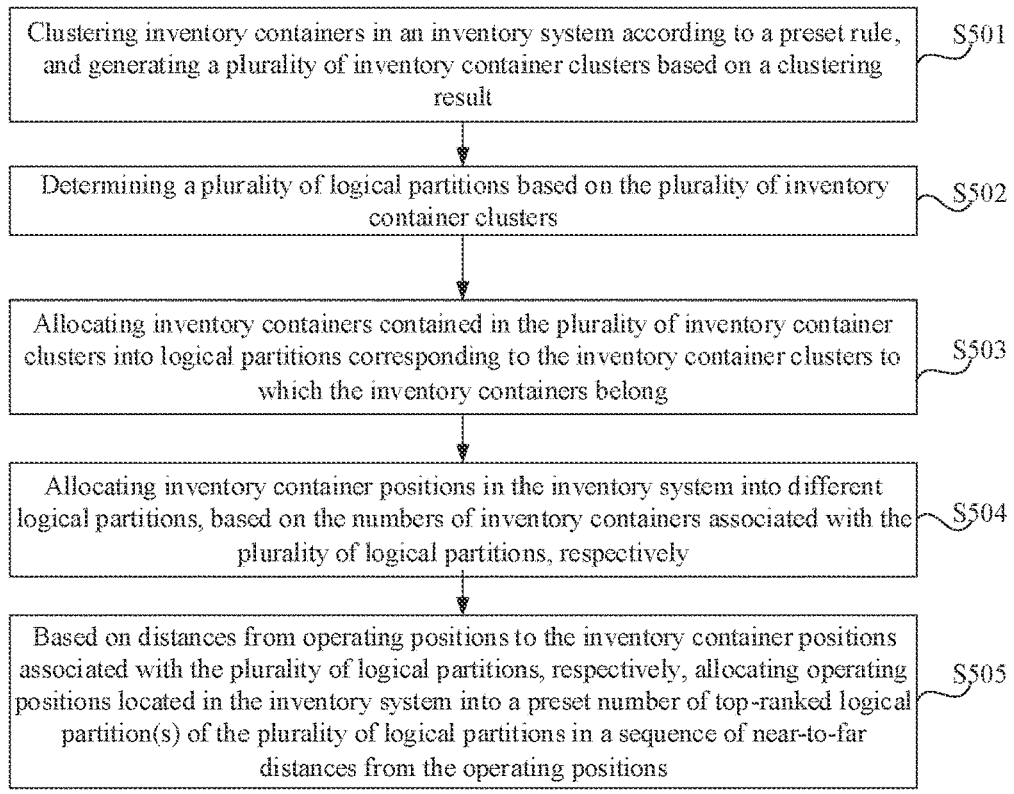
FIG. 5 is a flow chart of another logical partitioning method provided in embodiments of the present application.

FIG. 5 is a flow chart of another logical partitioning method provided in an embodiment of the present application, and the embodiment of the present application may be combined with multiple optional solutions in one or more of the above embodiments. As shown in FIG. 5, the logical partitioning method provided in the embodiment of the present application may include the following.

S501: clustering inventory containers in an inventory system according to a preset rule, and generating a plurality of inventory container clusters based on a clustering result.

In the embodiment of the present application, based on SKUs of a plurality of items on each inventory container located in the inventory system, a plurality of inventory containers located in the inventory system are clustered according to a preset rule, so that inventory containers of a same class are gathered together into an inventory container cluster, thereby allocating the plurality of inventory containers located in the inventory system into a plurality of inventory container clusters based on a clustering result of the plurality of inventory containers. The preset rule can ensure minimum or maximum cross degrees of items on inventory containers associated with the plurality of inventory container clusters. The above-mentioned "same class" does not mean a same type in the actual sense. Instead, the "same class" may be understood as a situation of often co-occurring according to the preset rule.

In an embodiment, the preset rules can be changed at regular timing, and the timing length may be set according to the actual situation, such as 24 hours, or shorter or longer time. It may be understood that a change in the preset rule leads to a change in a logical partitioning result.

In the embodiment of the present application, the clustering of the inventory containers in the inventory system may be performed at regular timing and a high frequency, and accordingly, SKU clusters contained in the inventory container clusters may be updated in real time based on the clustering result of the inventory containers in the inventory system.

S502: determining a plurality of logical partitions based on the plurality of inventory container clusters.

In this embodiment, each inventory container cluster corresponds to one logical partition, or each logical partition may correspond to a plurality of inventory container clusters. In an embodiment, each inventory container cluster corresponds to one logical partition. After inventory containers in the inventory system are clustered according to a preset rule, and a plurality of inventory container clusters are generated based on a clustering result, the number of partitions in the logical partitioning of the inventory system may be determined based on the generated plurality of inventory container clusters, to ensure that each inventory container cluster corresponds to at least one logical partition.

S503: allocating inventory containers contained in the plurality of inventory container clusters into logical partitions corresponding to the inventory container clusters to which the inventory containers belong.

In the embodiment of the present application, for example, three inventory container clusters are generated, a first inventory container cluster containing two inventory containers, a second inventory container cluster containing three inventory containers, and a third inventory container cluster containing four inventory containers; and the two inventory containers contained in the first inventory container cluster are allocated into a logical partition corresponding to the first inventory container cluster, the three inventory containers contained in the second inventory container cluster are allocated into a logical partition corresponding to the second inventory container cluster, and the four inventory containers contained in the third inventory container cluster are allocated into a logical partition corresponding to the third inventory container cluster.

S504: allocating inventory container positions in the inventory system into different logical partitions, based on the numbers of inventory containers associated with the plurality of logical partitions, respectively.

S505: based on distances from operating positions to the inventory container positions associated with the plurality of logical partitions, respectively, allocating operating positions located in the inventory system into a preset number of top-ranked logical partition(s) of the plurality of logical partitions in a sequence of near-to-far distances from the operating positions.

In an embodiment, for each operating position located in the inventory system, distances from each operating position to the inventory container positions associated with the plurality of logical partitions are calculated, a logical partition associated with an inventory container position at the closest distance from the operating position located in the inventory system is determined from the logical partitions, and the operating position located in the inventory system is allocated into the logical partition at the closest distance. In an embodiment, for each operating position, distances from each operating position to the inventory container positions associated with the plurality of logical partitions are calculated, the obtained plurality of distances are sequenced to determine a preset number of top-ranked logical partition(s) in a near-to-far sequence, and the operating position located in the inventory system is allocated into the preset number of top-ranked logical partition(s).

After logical partitioning is performed based on the above method, in processing of a target order, a logical partition to which the target order belongs is determined from the plurality of logical partitions as a target logical partition, wherein one logical partition is associated with at least one operating position and a plurality of inventory containers, and at least one of a plurality of inventory containers associated with the target logical partition contains an item required for the target order; and a subsequent process of order processing is performed.

In an optional implementation of the embodiment of the present application, determining a logical partition to which a target order belongs from a plurality of logical partitions as a target logical partition may include:

based on coincidence degrees between SKUs in the target order and SKU clusters contained in the plurality of inventory container clusters, respectively, determining a logical partition corresponding to SKU cluster(s) contained in a preset number of top-ranked inventory container cluster(s) of the plurality of inventory container clusters in a descending sequence of coincidence degrees with the SKUs in the target order, as the target logical partition, wherein the SKU cluster contained in each inventory container cluster is a list of SKUs on inventory containers contained in the inventory container cluster.

In this implementation, the SKU cluster contained in each inventory container cluster is a list of SKUs on inventory containers contained in the inventory container cluster. In this case, the SKU clusters contained in the inventory container clusters may be understood as SKU clusters of the corresponding logical partitions. The SKU cluster contained in each inventory container cluster corresponds to an SKU cluster of each logical partition. For the specific way of based on coincidence degrees between SKUs in the target order and the plurality of SKU clusters respectively, determining a logical partition corresponding to an SKU cluster with a high coincidence degree with the SKUs in the target order, as the target logical partition, reference may be made to the explanation of the foregoing embodiment, which will not be repeated here.

In the embodiment of the present application, historical order information and the rule for allocating inventory containers may change over time. Accordingly, after the inventory system is divided into logical partitions, the divided logical partitions are not invariable, and according to historical order information for a plurality of inventory containers in the inventory system and the rule for allocating the plurality of inventory containers, the logical partitions of the inventory system may be updated in real time at a preset time interval. For example, the logical partitions of the inventory system may be updated in real time once a week. For the update process, reference may be made to the above process of dividing the inventory system into a plurality of logical partitions.

Figure 6:
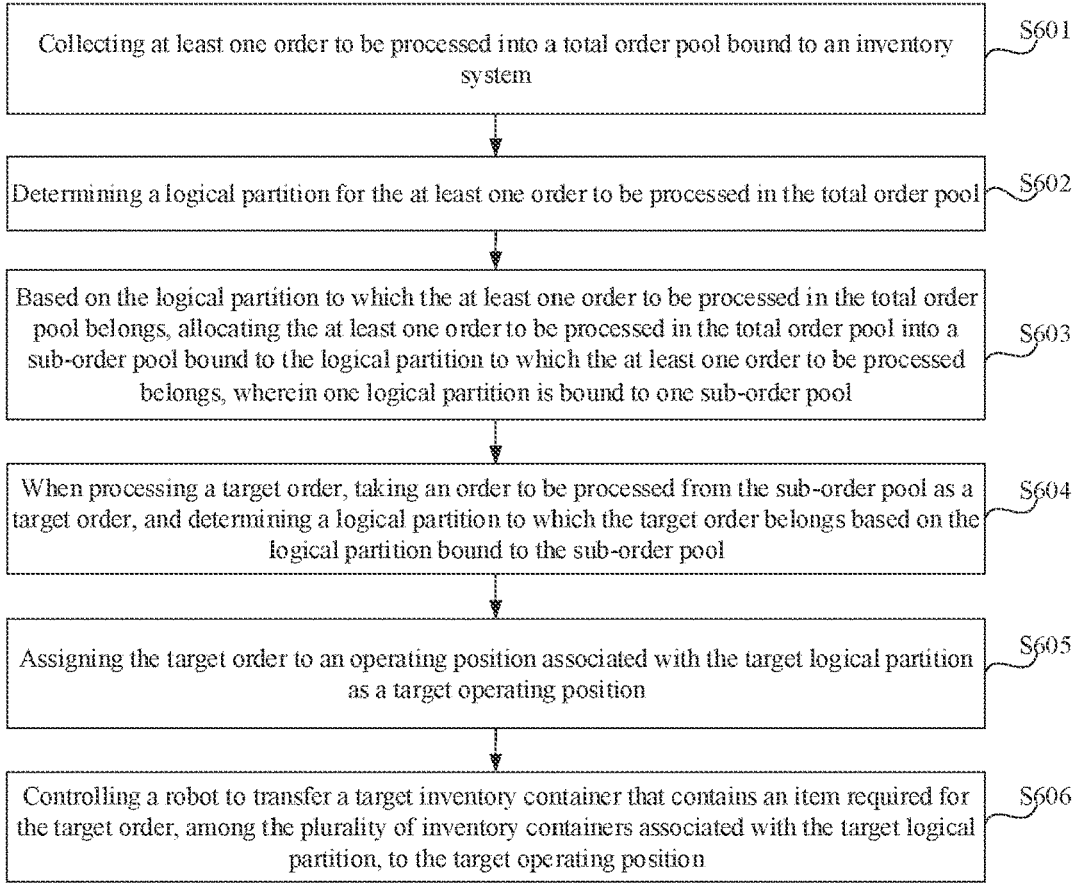
FIG. 6 is a flow chart of another order processing method provided in embodiments of the present application.

FIG. 6 is a flow chart of another order processing method provided in an embodiment of the present application, and the embodiment of the present application may be combined with multiple optional solutions in one or more of the above embodiments. As shown in FIG. 6, the order processing method provided in the embodiment of the present application may include the following.

S601: collecting at least one order to be processed into a total order pool bound to an inventory system.

S602: determining a logical partition for the at least one order to be processed in the total order pool.

In the embodiment of the present application, after orders to be processed is received, at least one received order to be processed is collected into a total order pool bound to an inventory system. The total order pool may sort the received orders to be processed and determine logical partitions to which a plurality of order belong respectively.

In an optional implementation of this embodiment, determining a logical partition for the at least one order to be processed in the total order pool may include:

for each order to be processed in the at least one order to be processed in the total order pool, based on coincidence degrees between SKUs in each order to be processed and SKUs contained in SKU clusters associated with a plurality of logical partitions, a logical partition corresponding to an SKU cluster with a high coincidence degree with the SKUs in the order to be processed is determined as a logical partition to which the order to be processed belongs, so as to subsequently push the order to be processed to a sub-order pool corresponding to the logical partition to which the order to be processed belongs.

In another optional implementation of this embodiment, determining a logical partition for the at least one order to be processed in the total order pool may include:

for each order to be processed in the at least one order to be processed in the total order pool, based on coincidence degrees between SKUs in each order to be processed and SKUs contained in a plurality of inventory container clusters, respectively, a logical partition corresponding to an SKU cluster with a high coincidence degree with the SKUs in the order to be processed is determined as a logical partition to which the order to be processed belongs, so as to subsequently push the order to be processed to a sub-order pool corresponding to the logical partition to which the order to be processed belongs. The SKU cluster contained in each inventory container cluster is a list of SKUs on inventory containers contained in the inventory container cluster.

In the embodiment of the present application, for the explanation of the above two implementations, reference may be made specifically to the explanation of "determining a logical partition to which a target order belongs from a plurality of logical partitions as a target logical partition" in the foregoing embodiment, which will not be repeated here.

S603: based on the logical partition to which the at least one order to be processed in the total order pool belongs, allocating the at least one order to be processed in the total order pool into a sub-order pool bound to the logical partition to which the at least one order to be processed belongs, wherein one logical partition is bound to one sub-order pool.

In the embodiment of the present application, each logical partition may be bound to one sub-order pool. For each order to be processed in an order pool, the logical partition to which the order to be processed belongs is already determined when the order to be processed is in the total order pool. Based on the logical partition to which the at least one order to be processed in the total order pool belongs, the order to be processed in the total order pool may be collected into a sub-order pool bound to the logical partition to which the order to be processed belongs.

S604: when processing a target order, taking an order to be processed from the sub-order pool as a target order, and determining a logical partition to which the target order belongs based on the logical partition bound to the sub-order pool.

In the embodiment of the present application, one logical partition is associated with at least one operating position and a plurality of inventory containers, and at least one of a plurality of inventory containers associated with the target logical partition contains an item required for the target order. Each logical partition may be bound to one sub-order pool, and an operating position associated with each logical partition are only allowed to acquire an order to be processed from a sub-order pool bound to the logical partition. After a sub-order pool from which an order to be processed is taken from is determined, a logical partition bound to the sub-order pool may be used as a target logical partition, i.e., a logical partition to which the target order belongs is used as a target logical partition. This has the advantage that in processing of a target order, there is no need to determine a target logical partition, and a logical partition to which the order to be processed belongs, as determined in the total order pool, may be used as the target logical partition, i.e., a logical partition bound to the sub-order pool is used as the target logical partition, so that the order processing time may be reduced and the order processing efficiency may be improved.

S605: assigning the target order to an operating position associated with the target logical partition as a target operating position.

In an optional implementation of the embodiment, assigning the target order to an operating position associated with the target logical partition may include: when detecting that an operating position associated with the target logical partition triggers a task, using the order to be processed in the sub-order pool bound to the target logical partition as the target order, and assigning the order to be processed in the sub-order pool bound to the target logical partition to an operating position associated with the target logical partition.

S606: controlling a robot to transfer a target inventory container that contains an item required for the target order, among the plurality of inventory containers associated with the target logical partition, to the target operating position.

In the order processing method provided in the embodiment of the present application, the target logical partition to which the target order belongs is determined from the plurality of logical partitions in the inventory system, and when orders are pushed into the inventory system, the system assigns different orders into different logical partitions, and for each order, eventually a picking operation is performed only in the logical partition to which the order belongs. That is, the order is assigned to an operating position associated with the logical partition to which the order belongs, and an inventory container is taken to the operating position from the logical partition to which the order belongs and picking is performed there, to ensure that the sum of distances between each of a plurality of inventory containers required in picking for the order and the operating position is as short as possible, so that an average transfer distance of the robot can be reduced greatly, and the picking efficiency is improved.

Based on the above embodiment, optionally, the order processing method of this embodiment may further include:

dividing the inventory system into a plurality of logical partitions, wherein any inventory container and any operating position in the inventory system each belongs a logical partition; and any inventory container position in the inventory system belongs a logical partition, and one logical partition is associated with a plurality of inventory container positions.

Based on the above embodiment, optionally, the order processing method of this embodiment may further include:

if an order capacity in the sub-order pool bound to the target logical partition is less than a preset capacity value, pushing the order to be processed in the total order pool into the sub-order pool bound to the target logical partition, to ensure that an order capacity in the sub-order pool bound to the target logical partition after the push is greater than or equal to the preset capacity value.

In this implementation, sub-order pools bound to a plurality of logical partition-bound may be set with a capacity upper limit of orders to be processed, and if an order to be processed capacity in a sub-order pool is below the upper limit threshold, the sub-order pool may acquire orders to be processed from the total order pool. The capacity upper limit of the sub-order pools is to ensure that task volumes of orders to be processed in the plurality of logical partitions are balanced, and avoid that orders to be processed fall into a single logical partition to cause other operating positions to be idle.

Based on the above embodiment, optionally, the order processing method of this embodiment may further include:

when SKUs of items on the inventory containers associated with the logical partition are detected to be inconsistent with SKUs in the SKU cluster associated with the logical partition, adjusting, across partitions, the locations of inventory containers located in different logical partitions.

In this implementation, for each logical partition, if SKUs of items on the inventory containers associated with each logical partition are detected to be inconsistent with SKUs in the SKU cluster associated with the logical partition, the locations of inventory containers located in different logical partitions may be adjusted across partitions in an inter-partition adjustment manner. Inter-partition adjustment may mean allowing the locations of inventory containers to be adjusted between inventory container positions associated with different logical partitions, to ensure that SKUs of real items of a logical partition are more proximate to SKUs in the SKU cluster of the logical partition, so that SKUs of items stored on inventory containers associated with the logical partition are consistent with the SKUs in the SKU cluster of the logical partition.

In this implementation, when the inventory containers associated with the logical partitions are adjusted across partitions, the adjustment may be performed in a static adjustment or dynamic adjustment manner, wherein static adjustment may mean adjusting the locations of a large number of inventory containers simultaneously based on hotness degrees of the inventory containers and hotness degrees of inventory container positions, when there is no order processing task, to ensure that inventory containers with higher hotness degrees are placed on inventory container positions with higher hotness degrees. Dynamic adjustment may mean that in an order processing operation state, two inventory containers that leave their respective inventory container positions at the same time and are involved in an order processing task are interchanged, so that an inventory container with a higher hotness degree of the two above-mentioned inventory containers enters an inventory container position with a higher hotness degree and is placed therein.

Based on the above embodiment, optionally, the order processing method of this embodiment may further include:

when a hotness degree of an inventory container in a logical partition is detected to be not matched with an inventory container position of the inventory container, adjusting the location of the inventory container in the logical partition in an intra-partition adjustment manner.

In this implementation, intra-partition adjustment may only allow location adjustment of different inventory containers in a same logical partition, to ensure that inventory containers with high hotness degrees in a same logical partition may be placed at inventory container positions with high hotness degrees. A hotness degree of an inventory container may be a predicted probability of the inventory container being hit for an order processing task, and the higher the probability, the higher the hotness degree is; and the hotness degree of the inventory container may also be the average of required traveling distances from all operating positions in a logical partition to which the inventory container belongs, and the closer the distance, the higher the hotness degree is. By placing inventory containers with high hotness degrees at inventory container positions with high hotness degrees closer to a picking operating position, the average transfer distance is reduced. In addition, in adjustments of inventory containers, priorities are set for a plurality of inventory containers, and when an inventory container meets a plurality of adjustment conditions at the same time, whether to prioritize intra-partition adjustment or inter-partition adjustment is determined by priorities thereof.

Based on the above embodiment, optionally, the order processing method of this embodiment may further include:

when detecting a need for replenishment, generating a partitioned replenishment order for logical partitions based on SKU clusters of the logical partitions; and replenishing items to inventory containers associated with the logical partitions based on the partitioned replenishment order for the logical partitions.

In this implementation, in the replenishment, a set of replenishment order may be generated for each logical partition based on the SKU clusters of the logical partitions described above. In generation of the replenishment order, it is ensured that items with each SKU may only be replenished to a logical partition to which an SKU cluster containing the SKU belongs. In addition, when items with a certain SKU are contained in SKU clusters in a plurality of logical partitions at the same time, the numbers of items with the SKU on inventory containers are balanced based on the numbers of items with the SKU already on inventory containers associated with the plurality of logical partitions, to ensure balanced numbers of items with the SKU on inventory containers.

In the above implementation, optional recommendations may be provided for inventory container adjustment, replenishment, and order assignment. According to an inventory recommendation provided to ensure SKU clusters of a plurality of logical partitions are maintained while the inventory remains static, a racking recommendation provided to ensure SKU clusters of a plurality of logical partitions are continuously maintained when goods are replenished, and an inventory base generated based on a decision of the above information together, resource matching may be performed to optimize order processing efficiency.

Described below is an embodiment of an order processing apparatus provided in an embodiment of the present application. The apparatus involves the same concept as the order processing method of the above embodiment, and for details not described fully in the embodiment of the order processing apparatus, reference may be made to the embodiment of the order processing method described above.

Figure 7:
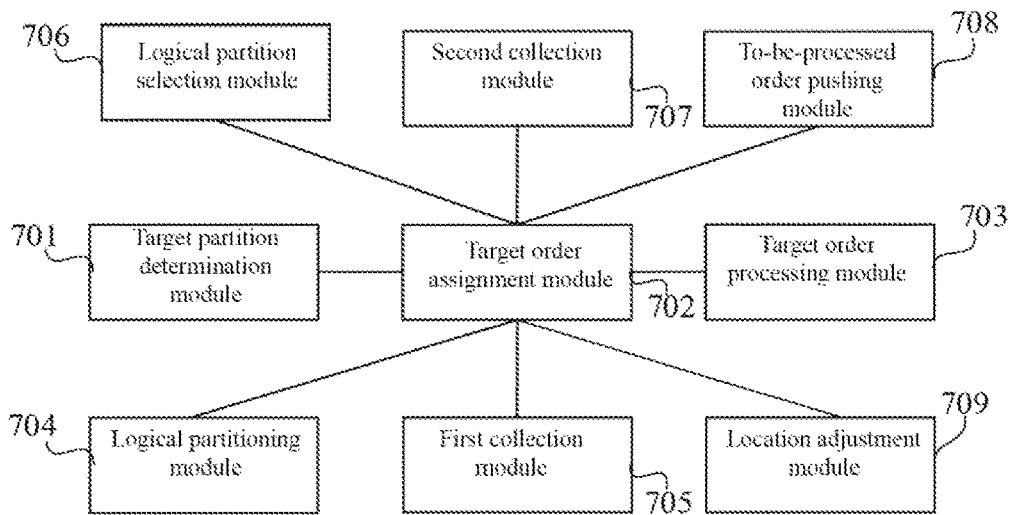
FIG. 7 is a structural diagram of an order processing apparatus provided in embodiments of the present application.

FIG. 7 is a structural diagram of an order processing apparatus provided in an embodiment of the present application. This embodiment may be applied to an order processing scenario, in particular to a scenario of processing orders in an inventory system. The apparatus may be implemented in software and/or hardware, and the apparatus may be integrated in multiple types of devices with a network communication function, which may be servers with a network communication function, such as in servers for processing orders in an inventory system scenario. As shown in FIG. 7, the order processing apparatus provided in the embodiment of the present application may include: a target partition determination module 701, a target order assignment module 702, and a target order processing module 703, wherein:

the target partition determination module 701 is configured to determine a logical partition to which a target order belongs from a plurality of logical partitions as a target logical partition, wherein one logical partition is associated with at least one operating position and a plurality of inventory containers, and at least one of a plurality of inventory containers associated with the target logical partition contains an item required for the target order;

the target order assignment module 702 is configured to assign the target order to an operating position associated with the target logical partition as a target operating position; and the target order processing module 703 is configured to control a robot to transfer a target inventory container that contains an item required for the target order, of the plurality of inventory containers associated with the target logical partition, to the target operating position.

Based on the above embodiment, optionally, the apparatus may further include:

a logical partitioning module 704 configured to divide an inventory system into the plurality of logical partitions, wherein any inventory container and any operating position in the inventory system belong a logical partition.

Based on the above embodiment, optionally, any inventory container position in the inventory system belongs a logical partition, and one logical partition is further associated with a plurality of inventory container positions.

Based on the above embodiment, optionally, the logical partitioning module 704 may include:

an SKU cluster generation unit configured to cluster, based on orders for clustering, SKUs contained in the orders for clustering, and generate a plurality of SKU clusters based on a clustering result, the orders for clustering including at least one of the following types: historical orders processed by an inventory system, orders to be processed by the inventory system, and orders predicted for the inventory system;

a first determination unit configured to determine the plurality of logical partitions based on the plurality of SKU clusters;

a first allocation module configured to, based on coincidence degrees between SKUs of items on the inventory containers and the plurality of SKU clusters, respectively, allocate inventory containers in the inventory system into a logical partition corresponding to a preset number of top-ranked SKU cluster(s) of the plurality of SKU clusters in a descending sequence of coincidence degrees with the SKUs of the items on the inventory containers;

a second allocation module configured to allocate inventory container positions in the inventory system into different logical partitions, based on the numbers of inventory containers associated with the plurality of logical partitions, respectively; and a third allocation module configured to, based on distances from operating positions to the inventory container positions associated with the plurality of logical partitions, respectively, allocate operating positions into a preset number of top-ranked logical partition(s) of the plurality of logical partitions in a sequence of near-to-far distances from the operating positions.

In an embodiment, the first allocation module is configured to:

based on coincidence degrees between SKUs of items on the inventory containers and the plurality of SKU clusters, respectively, allocate inventory containers in the inventory system into a logical partition corresponding to an SKU cluster with the highest coincidence degree with the SKUs of the items on the inventory containers, of the plurality of SKU clusters.

In an embodiment, the third allocation module is configured to:

based on distances from operating positions to the inventory container positions associated with the plurality of logical partitions, respectively, allocate operating positions located in the inventory system into a logical partition at the shortest distance from the operating positions, among the plurality of logical partitions.

Based on the above embodiment, optionally, the logical partitioning module 704 may further include:

an inventory container cluster generation unit configured to cluster inventory containers in the inventory system according to a preset rule, and generate a plurality of inventory container clusters based on a clustering result;

a second determination unit configured to determine the plurality of logical partitions based on the plurality of inventory container clusters;

a fourth allocation module configured to allocate inventory containers contained in the plurality of inventory container clusters into logical partitions corresponding to the inventory container clusters to which the inventory containers belong;

a fifth allocation module configured to allocate inventory container positions in the inventory system into different logical partitions, based on the numbers of inventory containers associated with the plurality of logical partitions, respectively; and a sixth allocation module configured to, based on distances from operating positions to the inventory container positions associated with the plurality of logical partitions, respectively, allocate operating positions into a preset number of top-ranked logical partition(s) of the plurality of logical partitions in a sequence of near-to-far distances from the operating positions.

In an embodiment, the sixth allocation module is configured to:

based on distances from operating positions to the inventory container positions associated with the plurality of logical partitions, respectively, allocate operating positions into a logical partition at the shortest distance from the operating positions, among the plurality of logical partitions.

Based on the above embodiment, optionally, the SKU cluster generation unit includes:

a correlation degree determination sub-unit configured to extract, based on historical orders of the inventory system, features for each SKU contained in the historical orders, and determine correlation degrees between a plurality of SKUs according to the extracted features; and a clustering sub-unit configured to cluster the plurality of SKUs based on the correlation degrees between the plurality of SKUs to obtain a clustering result.

Based on the above embodiment, optionally, the target partition determination module 701 may include:

a first target partition determination unit configured to, based on coincidence degrees between SKUs in the target order and the plurality of SKU clusters, respectively, determine a logical partition corresponding to a preset number of top-ranked SKU cluster(s) of the plurality of SKU clusters in a descending sequence of coincidence degrees with the SKUs in the target order, as the target logical partition.

Based on the above embodiment, optionally, the target partition determination module 701 may include:

a second target partition determination unit configured to, based on coincidence degrees between SKUs in the target order and SKU clusters contained in the plurality of inventory container clusters, respectively, determine a logical partition corresponding to a preset number of top-ranked SKU cluster(s) in the plurality of inventory container clusters in a descending sequence of coincidence degrees with the SKUs in the target order, as the target logical partition, the SKU cluster contained in each inventory container cluster being a list of SKUs on inventory containers contained in the inventory container cluster.

Based on the above embodiment, optionally, the apparatus may further include:

a first collection module 705 configured to collect at least one order to be processed into a total order pool bound to an inventory system;

a logical partition selection module 706 configured to determine a logical partition for the at least one order to be processed in the total order pool; and a second collection module 707 configured to, based on the logical partition to which the at least one order to be processed in the total order pool belongs, allocate the at least one order to be processed in the total order pool into a sub-order pool bound to the respective logical partition to which the at least one order to be processed belongs, wherein one logical partition is bound to one sub-order pool, wherein the target partition determination module 701 is configured to take an order to be processed from the sub-order pool as a target order, and determine a logical partition to which the target order belongs based on the logical partition bound to the sub-order pool.

Based on the above embodiment, optionally, the apparatus may further include:

a to-be-processed order pushing module 708 configured to, if an order capacity in the sub-order pool bound to the target logical partition is less than a preset capacity value, push the order to be processed in the total order pool into the sub-order pool bound to the target logical partition, to ensure that an order capacity in the sub-order pool bound to the target logical partition after the push is greater than or equal to the preset capacity value.

Based on the above embodiment, optionally, the target order assignment module 702 may include:

a target order assignment unit configured to, when detecting that an operating position associated with the target logical partition triggers a task, assign the order to be processed in the sub-order pool bound to the target logical partition to an operating position associated with the target logical partition.

Based on the above embodiment, optionally, the apparatus may further include:

a location adjustment module 709 configured to, when SKUs of items on the inventory containers associated with the logical partition are detected to be inconsistent with SKUs in the SKU cluster associated with the logical partition, adjust, across partitions, the locations of inventory containers located in different logical partitions.

The order processing apparatus provided in the embodiment of the present application may execute the above-mentioned order processing method provided in any embodiment of the present application and has corresponding functional modules and effects for executing the order processing method.

Figure 8:
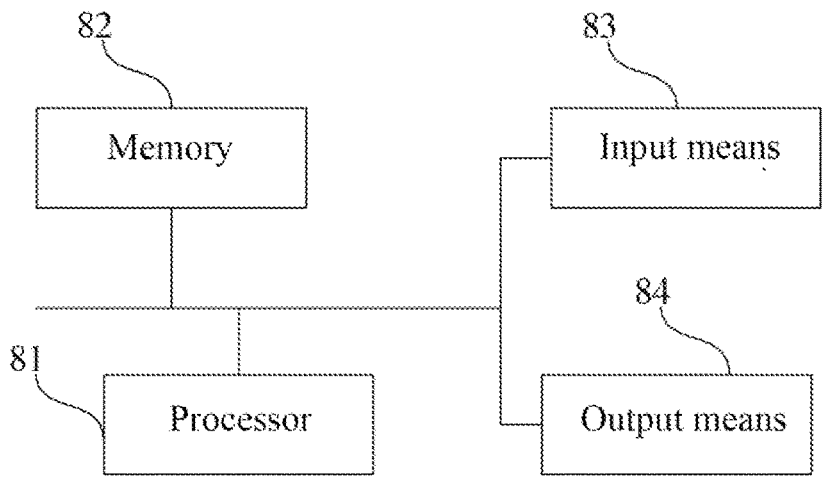
FIG. 8 is a structural diagram of a device provided in embodiments of the present application.

FIG. 8 is a structural diagram of a device provided in an embodiment of the present application. The electronic device in the embodiment of the present application is described by a computer device as an example. As shown in FIG. 8, the electronic device provided in the embodiment of the present application includes: one or more processors 81 and storage means 82; the electronic device may include one or more processors 81, one processor 81 as an example in FIG. 8; the storage means 82 is configured to store one or more programs; and the one or more programs are executed by the one or more processors 81 to cause the one or more processor 81 to implement the method as described in any embodiment of the present application.

The electronic device may further include: input means 83 and output means 84.

The processor(s) 81, the storage means 82, the input means 83 and the output means 84 in the electronic device may be connected via a bus or by other means. Connection via a bus is used in FIG. 8 as an example.

The storage means 82 in the electronic device, as a computer readable storage medium, may be configured to store one or more programs, which may be software programs, computer executable programs, and modules, such as the program instructions/modules corresponding to the order processing method provided in an embodiment of the present application, and the processor 81 runs the software programs, instructions, and modules stored in the storage means 82 to perform various functional applications and data processing of the electronic device, i.e., implement the method in the method embodiment described above.

The storage means 82 may include a program storing area and a data storing area, wherein the program storing area may store an operating system, and an application program required for at least one function; and the data storing area may store data created according to the use of the device, and the like. In addition, the storage means 82 may include a high-speed random access memory, and may also include a non-volatile memory, such as at least one disk storage device, flash memory device or other non-volatile solid-state memory device. In some embodiments, the storage means 82 may further include memories remotely provided from the processor 81, and these remote memories may be connected to the device through a network. Examples of the network described above include the Internet, an intranet, a local area network, a mobile communication network and combinations thereof.

The input means 83 may be configured to receive input numerical or character information and produce a key signal input related to user settings and functional control of the electronic device. The output means 84 may include a display device such as a display screen.

Furthermore, when the one or more computer programs included in the above-mentioned electronic device are executed by the one or more processors 81, the programs perform the following operations:

determining a logical partition to which a target order belongs from a plurality of logical partitions as a target logical partition, wherein one logical partition is associated with at least one operating position and a plurality of inventory containers, and at least one of a plurality of inventory containers associated with the target logical partition contains an item required for the target order;

assigning the target order to an operating position associated with the target logical partition as a target operating position; and controlling a robot to transfer an inventory container that contains an item required for the target order, of the plurality of inventory containers associated with the target logical partition, to the target operating position.

Those skilled in the art may understood that when the one or more computer programs included in the above-mentioned electronic device are executed by the one or more processors 81, the programs may also implement the method provided in any embodiment of the present application.

In the technical solution provided according to the embodiment of the present application, by top-to-bottom logical partitioning of the inventory system, a many-to-many mapping relationship of storage resources of inventory containers, transport resources of robots, and operation resources of operating positions is established by logical partitioning, so that various resources are optimally matched. Under the premise of ensuring balanced use of various system resources (inventory containers, inventory container positions, and operating positions), the average transfer distance of the inventory containers is reduced, thereby increasing the work efficiency. It can overcome the drawback that physical partitioning as a basis cannot give full play to the flexibility and high compliance, and compared with an order processing method based on physical partitioning, it can provide higher robot utilization and improve the order processing efficiency of the system.

In warehouse management, to increase warehouse operational efficiency and save costs, usually massive items, orders, storage locations are clustered based on existing information, and the key to the above-mentioned clustering is to classify different items into different clusters based on similarity or correlation.

In the related technology, item clustering is performed according to the description of different items to achieve clustering of different items, and the clustering requires detailed textual description of each type of item, and achieves a good clustering effect for items with similar description. However, in actual use, there are a lot of items that have a mutually supportive relationship in practical use, although no obvious connections between the items can be seen from their description, such as towels and soap boxes, and thus they are often clustered together. As can be seen, for items obvious connections between which cannot be seen from their description in the above case, the item clustering solution in the related technology cannot solve the problem and achieve good clustering.

In the inventory system shown in FIG. 1A, as the warehouse area increases, the movement distance of the robot in the warehouse increases, and the picking efficiency decreases accordingly; item stock-in and stock-out operations in the warehouse are a real-time dynamic process, and the locations of shelves in the warehouse are adjusted in real time, in order picking, orders are grouped into waves to effectively improve the stock-out efficiency; and in a cross-dock picking solution, for items involved in cross-dock operations, sorting time and picking operating positions are recommended based on correlation of the items to improve the efficiency of cross-dock picking. The above-mentioned various operations in the warehouse, especially for goods picking operations, are implemented by using a clustering result of items. Thus, it needs to improve the item clustering mode and determine an item clustering result.

Figure 9:
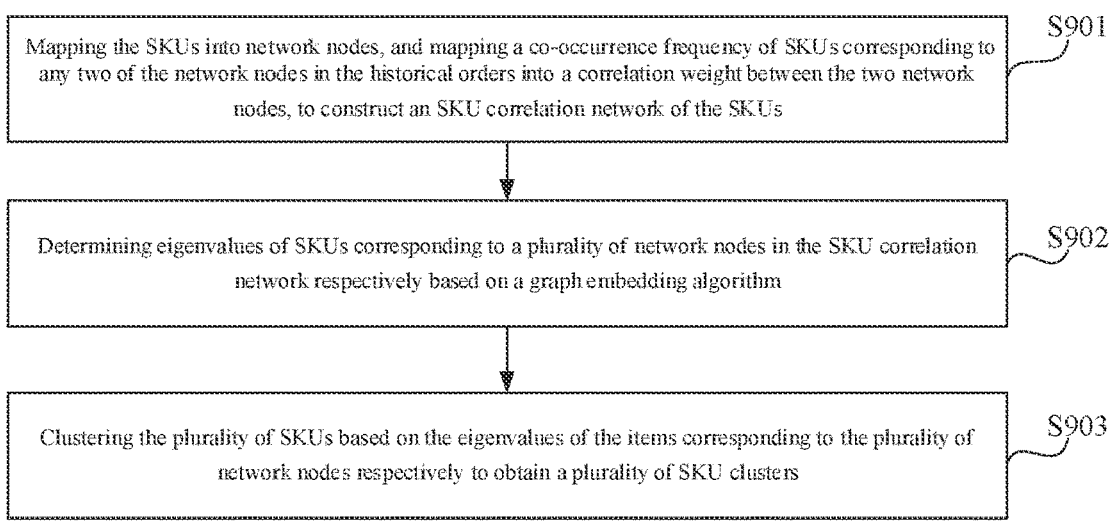
FIG. 9 is a flow chart of yet another order processing method provided in embodiments of the present application.

FIG. 9 is a flowchart of yet another order processing method provided in an embodiment of the present application. The embodiment of the present application may be applied to a scenario where items are clustered according to their correlation, especially a scenario in a warehouse management center, where massive items are clustered to increase the operational efficiency of the warehouse. The method may be performed by another order processing apparatus, which may be implemented in software and/or hardware, and the apparatus may be integrated in multiple types of devices with a network communication function, which may be terminal devices or servers. The terminal devices may be mobile phones, tablet computers, computers, or the like, and the servers may be back-end servers for data processing, or other servers. As shown in FIG. 9, clustering, based on orders for clustering, stock keeping units (SKUs) contained in the orders for clustering, and generating a plurality of SKU clusters based on a clustering result in the embodiment of the present application may include the following steps.

S901: mapping the SKUs into network nodes, and mapping a co-occurrence frequency of SKUs corresponding to any two of the network nodes in the historical orders into a correlation weight between the two network nodes, to construct an SKU correlation network of the SKUs.

In this embodiment, each type of item may be set with a unique SKU, and SKUs of items of a same item class may be located in a same SKU cluster; the SKU involved in the embodiment of the present application may be extended to be a short name for a unified number of items or items, and each type of items corresponds to a unique SKU number; and the term SKU may be understood as a unified number or unique identification number of items, and multiple types of items may be identified by SKUs corresponding to the multiple types of items. Therefore, in the embodiment of the present application, items or items may be represented by SKUs, i.e., items are also called SKUs, and item categories are also called SKU clusters, and both have the same meaning.

In this embodiment, various types of goods are involved, and the goods may be tangible goods, such as clothing, and food; or intangible goods, such as financial products. In addition, goods may have a certain correlation attribute with each other. The correlation attribute may be an inherent attribute in the goods, as a nature of the item that distinguishes them from other items in different fields, or be correlation between the items defined by behaviors of users. For example, in practical applications, a correlation attribute between items may be a co-occurrence attribute indicating that the items often co-occur, i.e., an attribute indicating that two items co-occur in a same order. A correlation network of items may be constructed based on the attribute indicating co-occurrence of two items. A correlation relationship between multiple items included in the goods correlation network may be reflected in the goods correlation network.

In this embodiment, if two items co-occur in a same historical order, it indicates that the two items have a co-occurrence correlation attribute; and if two items do not co-occur in a same historical order, it indicates that the two items do not have a co-occurrence correlation attribute In addition, given that the frequency of two items co-occurring in a same historical order may be once or multiple times, different frequencies may reflect different correlation degrees between the two items.

Figure 10:
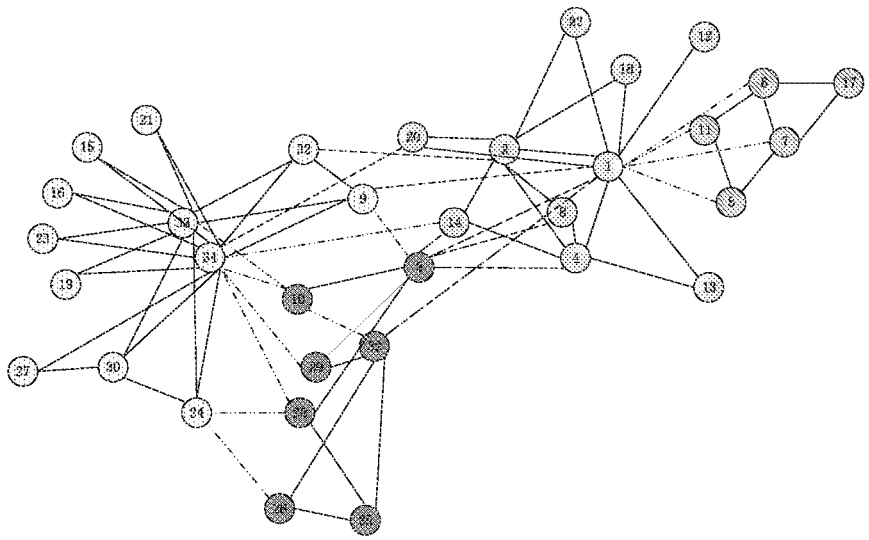
FIG. 10 is a network structural diagram of an SKU correlation network provided in embodiments of the present application.

In this embodiment, FIG. 10 is a network structural diagram of an SKU correlation network provided in an embodiment of the present application. Referring to FIG. 10, when the SKU correlation network between SKUs is constructed, a plurality of SKUs may be mapped into network nodes, and each network node may represent a dimension. If any two SKUs co-occur in a same historical order, an edge is added between the network nodes corresponding to the two SKUs to correlate the two SKUs; and if two SKUs do not co-occur in a same historical order, an edge is not added between the network nodes corresponding to the two SKUs, that is, the two SKUs are not correlated.

In this embodiment, referring to FIG. 10, given that the frequency of two items (also called SKUs) co-occurring in a same historical order may be once or multiple times, the frequency of items corresponding to any two network nodes co-occurring in a historical order may also be used as a reference when a goods correlation network is constructed. Optionally, the frequency of items corresponding to any two network nodes co-occurring in a historical order may be mapped into a correlation weight between the two network nodes. The frequency of the items corresponding to the two network nodes co-occurring in a historical order is in direct proportion to a weight of an edge added between the network nodes corresponding to the two items. The more times the two items co-occur in a historical order, the greater the weight of the line added between the network nodes corresponding to the two items in the constructed goods correlation network; and the fewer times the two items co-occur in a historical order, the smaller the weight of the edge added between the network nodes corresponding to the two items in the constructed goods correlation network. By adopting the above method, a goods correlation network more in line with actual situations may be constructed based on actual correlation between items, so that the real correlation degrees between a plurality of items may be reflected in the goods correlation network.

S902: determining eigenvalues of SKUs corresponding to a plurality of network nodes in the SKU correlation network respectively based on a graph embedding algorithm.

In this embodiment, after the goods correlation network is constructed, each item in the goods correlation network may be used as an object to be evaluated. For each item contained in the goods correlation network, the goods correlation network may be processed by a graph embedding algorithm, and eigenvalues of items corresponding to a plurality of network nodes respectively may be extracted from the goods correlation network. An eigenvalue of an item corresponding to a network node may be a feature vector used to represent correlation between the item and other item in the goods correlation network. Optionally, after the goods correlation network is constructed, a plurality of network nodes contained in the goods correlation network may be processed by a graph embedding algorithm, and correlation information of each network node with other network node is extracted from the goods correlation network as an eigenvalue of an item corresponding to the network node.

In this embodiment, the graph embedding algorithm may include: a DeepWalk algorithm and a large-scale information network embedding algorithm. Determining eigenvalues of SKUs corresponding to a plurality of network nodes in the SKU correlation network respectively based on a graph embedding algorithm may include: calculating the eigenvalues of the SKUs corresponding to the plurality of network nodes in the SKU correlation network respectively by using a DeepWalk algorithm or a large-scale information network embedding algorithm.

In an optional implementation, calculating the eigenvalues of the SKUs corresponding to the plurality of network nodes in the SKU correlation network respectively by using a DeepWalk algorithm may include the following steps S9021A-S9021B.

S9021A: at the time of each random walk, uniformly at random sampling a network node from the SKU correlation network as a starting point of the random walk, and during the walk, uniformly at random sampling a neighboring point with a correlation weight from the previous accessed node until the walk reaches a preset maximum length to end the random walk, to obtain a plurality of node sequences.

S9021B: training the plurality of node sequences by machine learning to obtain eigenvalues of the SKUs corresponding to the plurality of network nodes respectively.

In this implementation, implicit representation information of a plurality of network nodes in the SKU correlation network may be learned by using the DeepWalk algorithm. The implicit representation information may be understood as implicit correlation information between SKUs corresponding to the plurality of network nodes reflected in the SKU correlation network, respectively.

In this implementation, at least one network node may be uniformly selected from the goods correlation network by using a random walk generator, and each selected network node may be randomly walked across once by using a DeepWalk algorithm. Optionally, during each random walk, a network node may be uniformly at random sampled from the goods correlation network as a starting point of the random walk by using the random walk generator, and in each walk, a neighboring point with a correlation weight is uniformly at random sampled from the previous accessed network node until reaching a maximum length, to obtain a group of network nodes randomly walked this time as a node sequence of this random walk. In the above manner, a plurality of network nodes may be uniformly sampled by the random walk generator from the goods correlation network as starting points of random walks respectively, and multiple random walk processes are performed to finally obtain a plurality of node sequences.

In this implementation, after the plurality of network node sequences are obtained, the obtained plurality of node sequences may be trained by a preset machine learning model to map each network node in the node sequences obtained by random walks into a continuous vector space, respectively, thereby obtaining eigenvalues corresponding to a plurality of network nodes in the goods correlation network respectively. Using the DeepWalk algorithm, a plurality of node sequences may be obtained from the goods correlation network by random walks, then the node sequences are trained, and correlation feature vectors between a plurality of network nodes are obtained by learning from the node sequences, and thus eigenvalues of items corresponding to the plurality of network nodes included in the goods correlation network may be obtained.

Exemplarily, referring to FIG. 10, the goods correlation network may contain a plurality of network nodes and correlation weights between the plurality of network nodes. The goods correlation network may be represented by an item correlation graph G=(V, E). In the goods correlation network G=(V, E), V represents item types in the goods correlation network, E represents connections between points of V; different symbols V are used to name different network nodes, and a two-dimensional array storage structure is used to indicate whether there is a connecting line between two network nodes, where 1 indicates there is a connecting edge, and 0 indicates there is no connecting edge. A specific process is as follows: during each random walk, a network node $v_i$ may be randomly and uniformly selected from the goods correlation network G=(V, E) by using the depth random walk algorithm, and a random walk is performed with the selected network node $v_i$ as a starting point of this random walk, and thus a group of network nodes randomly walked across this time may be obtained as a node sequence of this random walk. A plurality of network nodes are uniformly sampled from the goods correlation network as starting points of random walks respectively, multiple random walk processes are performed to finally obtain a plurality of node sequences. After a plurality of node sequences with a fixed length are constructed and generated, a continuous skip-gram model (Skip-gram model) may be used to train the constructed and generated node sequences, and obtain low-dimensional feature vectors corresponding to a plurality of network nodes respectively by learning from intermediate network nodes in the training, and the low-dimensional feature vectors corresponding to the plurality of network nodes respectively are used as eigenvalues of items corresponding to the plurality of network nodes included in the goods correlation network. For example, the plurality of node sequences obtained by random walks may be specifically: 1-4-13-1-11-5-7 . . . , 33-34-10-3-20-25 . . . , and 28-24-30-27-9-21 . . . , and the node sequences may be trained to obtain a low-dimensional feature vector corresponding to each network node in the goods correlation network, i.e., obtain eigenvalues of items corresponding to a plurality of network nodes respectively. Referring to FIG. 10, eigenvalues of items corresponding to a network node 1 may be: 0.016579, −0.0336, 0.3452167, 0.04698 . . . ; and eigenvalues of items corresponding to a network node 2 may be: −0.00703, 0.26589, −0.351422, 0.043923 . . . .

In this implementation, by using the above technical solution, in the extraction of the eigenvalues of the items corresponding to the plurality of network nodes respectively from the goods correlation network, the characteristics of adaptivity (re-learning is not needed after new network nodes are added), rationality (a high probability of grouping network nodes with similar feature vectors into a same class), low dimension (low-dimensional feature vectors may be generated, which may increase the classification efficiency of items), and continuity (order representation may be performed in a continuous space to improve a classification effect) of the DeepWalk algorithm is fully used to better extract the eigenvalues of the items corresponding to plurality of network nodes respectively from the goods correlation network.

By using the DeepWalk algorithm, correlation information between a plurality of network nodes may be extracted from the goods correlation network as much as possible to obtain eigenvalues of items corresponding to the plurality of network nodes respectively. However, the DeepWalk algorithm only considers the first-order proximity of the items, and information of multi-order proximity hidden more deeply in the goods correlation network cannot be obtained effectively. In view of the above situation, an embodiment of the present application may use a large-scale information network embedding algorithm to extract the information of multi-order proximity hidden more deeply from the goods correlation network.

In an optional implementation, calculating the eigenvalues of the SKUs corresponding to the plurality of network nodes in the SKU correlation network respectively by using a large-scale information network embedding algorithm may include the following steps S9022a-S9022c.

S9022a: determining first-order similarity degrees between the plurality of network nodes in the SKU correlation network and optimizing the first-order similarity degrees between the plurality of network nodes to obtain first feature vectors of the SKUs corresponding to the plurality of network nodes respectively.

S9022b: determining second-order similarity degrees between the plurality of network nodes in the SKU correlation network and optimizing the second-order similarity degrees between the plurality of network nodes to obtain second feature vectors of the SKUs corresponding to the plurality of network nodes respectively.

S9022c: splicing the first feature vectors and the second feature vectors to obtain feature vectors of the SKUs corresponding to the plurality of network nodes respectively.

In this implementation, both the first-order similarity degree and second-order similarity degree are introduced, and the more deeply hidden multi-order proximity information is extracted from the goods correlation network by combining the first-order similarity degree and second-order similarity degree, to extract eigenvalues of items corresponding to a plurality of network nodes respectively from the goods correlation network.

In this implementation, the first-order similarity degree in the goods correlation network may refer to a local pairwise similarity degree between two network nodes, and a weight of a connecting line between the two network nodes may be used to represent the first-order similarity degree between the two network nodes. If there is no side between the two network nodes, it indicates that the first-order similarity degree between the two network nodes is 0. The second-order similarity degree in the goods correlation network may refer to a similarity degree between neighboring network structures in the goods correlation network. For example, $p_u$ represents a first-order similarity degree between a network node u to other neighboring network node in the goods correlation network, $p_v$ represents a first-order similarity degree between a network node v to other neighboring network node, and accordingly, a second-order similarity degree between the network node v and the network node u is the similarity degree between $p_u$ and $p_v$. If no other network node is connected to the network node u and the network node v, then the second-order similarity degree between the network node v and the network node u is 0.

In this implementation, to ensure the accuracy of obtained first-order similarity degrees, after the first-order similarity degrees between the plurality of network nodes in the goods correlation network are determined, the first-order similarity degrees between the plurality of network nodes may be optimized to obtain first feature vectors of items corresponding to the plurality of network nodes; in addition, second-order similarity degrees between the plurality of network nodes in the goods correlation network may be determined based on the first-order similarity degrees between the plurality of network nodes, and the second-order similarity degrees between the plurality of network nodes may be optimized to obtain second feature vectors of the items corresponding to the plurality of network nodes In this implementation, after the first feature vectors and the second feature vectors of the items corresponding to the plurality of network nodes are obtained, the first feature vectors and the second feature vectors may be spliced to obtain third feature vectors corresponding to the plurality of network nodes, and the third feature vectors are used as feature vectors of the items corresponding to the plurality of network nodes. In addition, the first feature vectors and the second feature vectors may not both satisfy the minimum similarity condition. In other words, even if the first-order similarity degree represented by the first feature vector alone satisfies the minimum similarity condition, and the second-order similarity degree represented by the second feature vector alone satisfies the minimum similarity condition, it does not mean that a similarity degree represented by the spliced third feature vector also satisfies the minimum similarity condition. In view of this, weight ratios may be set for the first feature vector and the second feature vector, respectively, and the weight ratios are used to balance the spliced third feature vector. For example, using a first feature vector A and a second feature vector B as an example, a spliced third feature vector is C=[A; B], and a weight β is set for normalizing the first feature vector A and a weight γ is set for normalizing the second feature vector B, to obtain a weight-balanced third feature vector C"=[β*A; γ*B], and the weight-balanced third feature vector C' is used as the feature vector of items corresponding to a plurality of network nodes, i.e., obtain eigenvalues of items corresponding to the plurality of network nodes.

In this implementation, to better splice the first feature vector and the second feature vector, the first feature vector and the second feature vector may be respectively normalized first, and then the normalized first feature vector and second feature vector are spliced to obtain a spliced third feature vector. Optionally, when the normalized first feature vector and second feature vector are spliced, the weight ratios of the first feature vector and the second feature vector may be balanced, to obtain accurate feature vectors of the items corresponding to the plurality of network nodes respectively.

In this implementation, the goods correlation network may be represented by an item correlation graph G=(V, E). In the item correlation graph G=(V, E), V represents item types in the goods correlation network, E represents connections of points of V, and each pair of lines is an ordered pair e=(u, v) and has a weight $w_{uv}$ greater than zero, and indicates how many orders in all orders contain both types of items u,v. A large-scale network algorithm may be used to map each network node v in the item correlation graph to a low-dimensional space $R^d$, and a function $f_G: V \to R^d$ is earned, d<<|V|, to retain the first-order similarity degree and second-order similarity degree in the space $R^d$. Optimization of the first-order similarity degree and optimization of the second-order similarity degree are described below exemplarily.

(1) Optimization of the First-Order Similarity Degree

In an embodiment, for each side (i, j) in the item correlation graph G=(V, E), the probability of connection between two network nodes $v_i$, $v_j$ may be defined as;

$$p_1(v_i, v_j) = \frac{1}{1 + \exp\left(-\vec{u}_i^T \cdot \vec{u}_j\right)}$$

where $u_i$ is a low-dimensional vector representation of $v_i$, a distribution in a V×V space defined by the item correlation graph G=(V, E), and an empirical distribution $$\hat{p}_1(i, j) = \frac{w_{ij}}{W}, \text{ where } W = \sum_{(i,j) \in E} w_{ij}.$$

To retain the first-order similarity degree, the following objective function may be reduced: $O_1 = d(\hat{p}_1(.,.), p_1(.,.))$, where d is the distance between two distributions.

Reducing the KL divergence of the two probability distributions, and replacing a distance function with the KL divergence and removing constants results in $$O_1 = -\sum_{(i,j) \in E} w_{ij} \log p_1(v_i, v_j),$$

and after calculating $$\{u_i^{\vec{\omega}}\}_{i=1,\Lambda,|V|}$$

that reduces the formula, each point in a d dimensional space may be represented, and thus a first feature vector may be obtained.

(2) Optimization of the Second-Order Similarity Degree

In an embodiment, given a hypothetical directed item correlation graph G=(V, E), assuming that any network node shares multiple connections with other network nodes, there are two cases for each network node: the network node itself and external nodes of other network nodes, at which point two vectors $$\overset{\rho}{u_i}, \overset{\rho_I}{u_i}$$

are introduced, representing a network node $v_i$ and an external node $v_i$, respectively, and for each directed edge (i, j), the probability that the environment $v_j$ generates a network node $v_i$ is first defined:

$$p_2(v_j, v_i) = \frac{\exp\left(\vec{u}_j'^T \cdot \vec{u}_i\right)}{\sum_{k=1}^{|V|} \exp\left(\vec{u}_k'^T \cdot \vec{u}_i\right)}$$

where |V| is the number of network node or environment. For each network node $v_1$, the above formula $p_2(v_j, v_i)$ determines a conditional distribution over the environment.

To retain the second-order similarity degree, the conditional distribution should be determined from a low-dimensional representation to approximate an empirical distribution $\hat{p}_2(\cdot|v_i)$, and the simplest way to do this is to reduce the following objective function:

$$O_2 = \sum_{i \in V} \lambda_i d(\hat{p}_2(\cdot|v_i), p_2(\cdot|v_i))$$

where d(.,.) represents the distance between the two distributions, and due to different importance of network nodes in the item correlation graph G=(V, E), $\lambda_1$ is introduced to represent the importance of a network node i measurable by degree or algorithm.

In an empirical distribution $$\hat{p}_2(v_j | v_i) \frac{w_{ij}}{d_i}, w_{ij}$$

represents a weight of an edge (i, j), $d_i$ is an out-degree of a node i. To simplify the calculation, KL divergence is introduced as a distance function, $\lambda_i$ is set as the degree $d_i$ and constants are removed to obtain the following objective function:

$$O_2 = \sum_{(i,j) \in E} w_{ij} \log p_2(v_j | v_i)$$

After reducing the objective function of the formula by learning $$\{u_i^{\varpi}\}_{i=1,\Lambda,|V|}$$

and $$\{u_i^{\varpi'}\}_{i=1,\Lambda,|V|},$$

each node may be represented by a d dimensional vector $$\vec{u}_i,$$

and thus a second feature vector may be obtained.

After the above optimization of the first-order similarity degree and the second-order similarity degree, the first feature vector and the second feature vector may be obtained, and by splicing the first feature vector and second feature vector, feature vectors of the items corresponding to the plurality of network nodes respectively may be obtained.

In this implementation, when the above objective function $O_1$ and objective function $O_2$ are trained jointly by using the first-order similarity degree and second-order similarity degree, considering the need to accumulate all nodes when the conditional probability $p_2$ is calculated, which is very high in cost, "negative sampling" is introduced to sample multiple negative edges according to a noise distribution of an edge between each node (i, j), and in particular, the following function is specified for the side between each node:

$$\log \sigma\left(\vec{u}_j'^T \cdot \vec{u}_i\right) + \sum_{i=1}^{K} E_{v_n \sim P_n(v)}\left[\log \sigma\left(\vec{u}_n'^T \cdot \vec{u}_i\right)\right]$$

where $\sigma(x)=1/(1+\exp(-x))$, the first item constructs an observed side, the second item constructs a negative edge drawn by the noise distribution, and K is the number of negative edges. Let $P_n(v) \propto d_v^{3/4}$, where $d_v$ is an out-degree of a nodev. In addition, to optimize the above formula, an asynchronous stochastic gradient descent (ASGD) algorithm may be used for the optimization.

S903: clustering the plurality of SKUs based on the eigenvalues of the items corresponding to the plurality of network nodes respectively to obtain a plurality of SKU clusters.

In this embodiment, after the eigenvalues of the SKUs corresponding to the plurality of network nodes in the SKU correlation network are obtained, the SKUs corresponding to the plurality of network nodes in the SKU correlation network may be clustered based on the eigenvalues of the SKUs corresponding to the plurality of network nodes respectively by using a preset clustering algorithm. Based a clustering result of the SKUs corresponding to the plurality of network nodes, the SKUs corresponding to the plurality of network nodes included in the SKU correlation network may be allocated to different SKU clusters, to obtain a plurality of SKU clusters. The preset clustering algorithm may be used for clustering analysis of the SKUs corresponding to the plurality of network nodes included in the SKU correlation network. Optionally, the preset clustering algorithm may include, but is not limited to, K-mean clustering (K-means), spectral clustering, etc.

In this embodiment, clustering in this embodiment may be understood as dividing an item set containing a plurality of items into different classes or clusters according to a particular criterion such that the similarity of items located in a same class or cluster is as great as possible, while the difference of items not located in a same class or cluster is also as great as possible.

In an optional implementation of this embodiment, after determining eigenvalues of SKUs corresponding to a plurality of network nodes in the SKU correlation network based on a graph embedding algorithm, the method may further include:

using one eigenvalue as one dimension, performing dimensionality reduction on the eigenvalues of the SKUs corresponding to the plurality of network nodes in the SKU correlation network respectively.

In this implementation, after eigenvalues of items corresponding to a plurality of network nodes in the goods correlation network respectively are determined based on a graph embedding algorithm, the dimensionality of the eigenvalue of the item corresponding to each network node may still be relatively high, and there may be invalid data in the eigenvalue of the item corresponding to each network node. If the dimensionality of the eigenvalue of the item corresponding to each network node is relatively high or there is invalid data in the eigenvalue, the complexity of data processing is increased when clustering is performed based on the eigenvalues of the items corresponding to the plurality of network nodes, thereby affecting the clustering efficiency of the items. Thus, a preset dimensionality reduction algorithm may be used to, using the eigenvalue of the item corresponding to each network node as one dimension, perform dimensionality reduction on the eigenvalues of the items corresponding to the plurality of network nodes in the goods correlation network respectively. The preset dimensionality reduction algorithm may include principal component analysis (PCA), isometric mapping (Isomap), laplacian eigenmaps (LE), locally linear embedding (LLE) and t-distributed stochastic neighbor embedding (t-SNE) algorithms.

In the technical solution of the embodiment of the present application, by mapping items into network nodes, and mapping a co-occurrence frequency of items corresponding to any two network nodes in the historical orders into a correlation weight between the two network nodes, a goods correlation network of items may be constructed, and by determining eigenvalues of items corresponding to a plurality of network nodes in the goods correlation network respectively based on a graph embedding algorithm, features may be extracted from items obvious connections between which cannot be seen from their description, and thus a plurality of items may be clustered based on the eigenvalues of the items corresponding to the plurality of network nodes respectively to obtain a plurality of item classes. In this way, clustering of different items is achieved, the clustering effect between items is improved, and the efficiency of subsequent picking of items is substantially increased.

Figure 11:
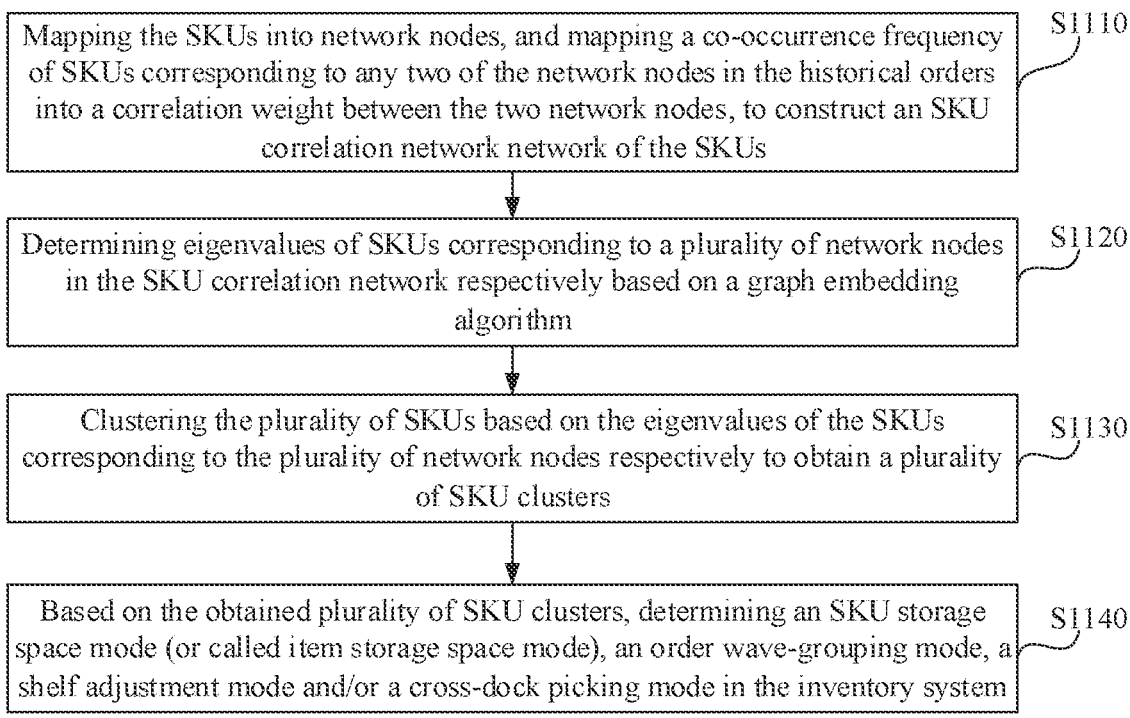
FIG. 11 is a flow chart of yet another order processing method provided in embodiments of the present application.

FIG. 11 is a flow chart of still another order processing method provided in an embodiment of the present application, and the embodiment of the present application may be combined with multiple optional solutions in one or more of the above embodiments. As shown in FIG. 11, the order processing method provided in the embodiment of the present application may include:

S110: mapping the SKUs into network nodes, and mapping a co-occurrence frequency of SKUs corresponding to any two of the network nodes in the historical orders into a correlation weight between the two network nodes, to construct an SKU correlation network of the SKUs;

S1120: determining eigenvalues of SKUs corresponding to a plurality of network nodes in the SKU correlation network respectively based on a graph embedding algorithm;

S1130: clustering the plurality of SKUs based on the eigenvalues of the SKUs corresponding to the plurality of network nodes respectively to obtain a plurality of SKU clusters;

S1140: based on the obtained plurality of SKU clusters, determining an SKU storage space mode (or called item storage space mode), an order wave-grouping mode, a shelf adjustment mode and/or a cross-dock picking mode in the inventory system.

The technical solution of the embodiment of the present application solves the problem of not being able to cluster well items obvious connections between which cannot be seen from their description, achieves clustering of different items, improves the clustering effect between items, and thus can provide guidance for an SKU storage space mode, an order wave-grouping mode, a shelf adjustment mode and/or a cross-dock picking mode in the warehouse based on a clustering result.

Operation steps of, based on the obtained plurality of SKU clusters, determining an SKU storage space mode, an order wave-grouping mode, a shelf adjustment mode and/or a cross-dock picking mode in the warehouse are introduced below respectively.

Figure 12:
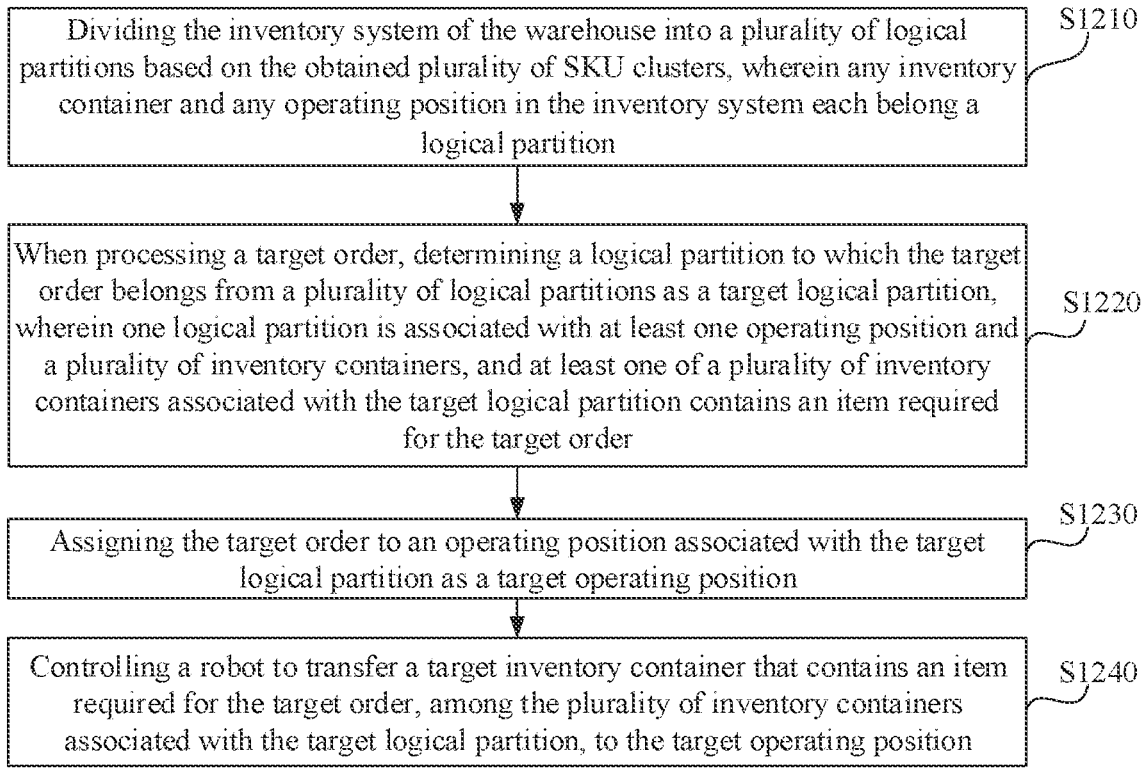
FIG. 12 is a flow chart of determining an SKU storage mode based on an SKU clustering result provided in the embodiment of the present application.

In an application scenario solution of this embodiment, a detailed solution of determining an SKU storage space mode based on an SKU clustering result is provided in this embodiment. FIG. 12 is a flow chart of determining an SKU storage space mode based on an SKU clustering result provided in the embodiment of the present application. As shown in FIG. 12, steps of determining an SKU storage space mode based on an SKU clustering result provided in the embodiment of the present application may include the following.

S1210: dividing the inventory system of the warehouse into a plurality of logical partitions based on the obtained plurality of SKU clusters, wherein any inventory container and any operating position in the inventory system each belong a logical partition.

In this embodiment, the technical solution of this embodiment processes orders based on logical partitioning as opposed to the traditional solution that processes orders based on physical partitioning. In other words, with the solution of this embodiment, in processing of orders, orders are not processed based on physical partitioning, but on logical partitioning. Logical partitioning management is not traditional partitioning management of the inventory system based on physical locations, but partitioning management of the inventory system from a logical point of view.

In this embodiment, the inventory system is provided with fixed inventory container positions, and inventory containers may be placed in the corresponding inventory container positions. Each inventory container position may only correspond to one inventory container at any time, and each inventory container can only be placed at the corresponding inventory container position. Of course, the correspondence relationship between the inventory container positions and the inventory containers may be adjusted adaptively according to positional adjustment of the inventory containers in the inventory system.

In this embodiment, the inventory system may include a plurality of logical partitions, wherein each logical partition in the inventory system may be associated with at least one operating position in the inventory system (in an optional solution, one logical partition is associated with one operating position in the inventory system) as well as a plurality of inventory containers and a plurality of inventory container positions; the sum of the inventory containers associated with all logical partitions is at least part or even all of the inventory containers in the inventory system; and the sum of the inventory container positions associated with all logical partitions is at least part or even all of the inventory container positions in the inventory system. The inventory containers may include shelves or containers in other forms, and pallets, bins, and other item-carrying means may be placed on the shelves.

In an optional implementation of this embodiment, dividing the inventory system of the warehouse into a plurality of logical partitions based on the obtained plurality of SKU clusters may include the following steps S1210a-S1210d.

S1210a: determining the plurality of logical partitions based on the obtained plurality of SKU clusters.

In this implementation, each SKU cluster (also called item class) corresponds to one logical partition, or each logical partition may correspond to a plurality of SKU clusters. In an embodiment, each SKU cluster corresponds to one logical partition. After the plurality of SKU clusters are obtained, the number of partitions in the logical partitioning of the inventory system may be determined based on the obtained plurality of SKU clusters, to ensure that each SKU cluster corresponds to at least one logical partition.

S1210b: based on coincidence degrees between SKUs on inventory containers in the inventory system and SKUs in the plurality of SKU clusters, allocating inventory containers in the inventory system into a logical partition corresponding to a preset number of top-ranked SKU cluster(s) of the plurality of SKU clusters in a descending sequence of coincidence degrees with the SKUs on the inventory containers.

In this implementation, a plurality of inventory containers of the inventory system may store one or more types of stock items, and stock items stored on different inventory containers may differ to some degree, i.e., stock items stored on different inventory containers may or may not be same, or some of the stock items may be same and the other stock items may be different. Thus, for each inventory container in the inventory system, item matching may be performed between items stored on each inventory container and items in the plurality of item classes respectively, and based on coincidence degrees between stock items on inventory containers in the inventory system and the items in the plurality of item classes, the inventory containers in the inventor system are allocated into a logical partition corresponding to an item class with the highest coincidence degree therewith.

In this implementation, based on the coincidence degrees between the items on the inventory containers and the items included in the item classes, an inventory container with the highest coincidence degree may be allocated into a logical partition corresponding to an item class matched therewith. Optionally, a plurality of inventory containers may be sequenced based on the coincidence degrees between the items on the inventory containers and the items included in the item classes, and a preset number of top-ranked inventory containers in a descending sequence of coincidence degrees may be allocated into a logical partition corresponding to an item class matched therewith.

Exemplarily, an inventory system including three inventory containers and two item classes is used as an example. The three inventory containers are a first inventory container, a second inventory container, and a third inventory container. The first inventory container stores a first item, a second item, a third item, and a fourth item; the second inventory container stores the second item, the third item, and the fourth item; and the third inventory container stores the first item, a fifth item, a sixth item, and a seventh item. The two item classes are an item class of a first logical partition and an item class of a second logical partition. The item class of the first logical partition includes: the first item, the second item, the third item, and the fourth item, and the item class of the second logical partition includes: the first item, the fifth item, the sixth item, and the seventh item.

It is not difficult to see that the items stored on the first inventory container are identical to the items contained in the item class of the first logical partition, the items stored on the second inventory container include 3 identical items compared to the items contained in the item class of the first logical partition, and the items stored on the third inventory container include only 1 identical item compared to the items contained in the item class of the first logical partition. At this point, sequencing is performed based on coincidence degrees between the items on the three inventory containers and items contained in the item cluster of the first logical partition in a descending sequence to result in the first inventory container, the second inventory container, and the third inventory container in this order. Similarly, sequencing is performed based on coincidence degrees between the items on the three inventory containers and the items contained in the item cluster of the second logical partition in a descending sequence to result in the third inventory container, the second inventory container, and the first inventory container in this order.

Based on the above analysis, the first inventory container with the highest coincidence degree with the items contained in the item cluster of the first logical partition may be allocated into the first logical partition, and the third inventory container with the highest coincidence degree with the items contained in the item cluster of the second logical partition may be allocated into the second logical partition.

S1210c: allocating inventory container positions in the inventory system into different logical partitions, based on the numbers of inventory containers associated with the plurality of logical partitions, respectively.

In this embodiment, after a plurality of inventory containers in the inventory system are allocated into logical partitions to which the plurality of inventory containers belong, each logical partition may be associated with at least one inventory container. Given that each inventory container position may only correspond to one inventory container at any time, and each inventory container can only be placed at the corresponding inventory container position, after a plurality of inventory containers in the inventory system are allocated into logical partitions to which the plurality of inventory containers belong, logical partitioning is further performed on inventory container positions in the inventory system. Inventory container positions in the inventory system may be allocated into different logical partitions, based on the numbers of inventory containers associated with the plurality of logical partitions. To ensure that inventory containers of a same logical partition are placed in a same location as much as possible, inventory container positions in the inventory system are allocated into different logical partitions in sequence, based on the numbers of inventory containers associated with the plurality of logical partitions, and according to a preset orientation sequence. The preset orientation sequence may be understood as a left-to-right, right-to-left, front-to-back or back-to-front orientation sequence.

Exemplarily, FIG. 4 is a schematic diagram of logical partitioning of inventory container positions provided in an embodiment of the present application. Referring to FIG. 4, using an inventory system divided into a first logical partition, a second logical partition, and a third logical partition as an example, the number of inventory containers associated with the first logical partition is 20, the number of inventory containers associated with the second logical partition is 30, and the number of inventory containers associated with the third logical partition is 40; and based on the number of inventory containers associated with each logical partition, 20 inventory containers may be allocated into the first logical partition, 30 inventory containers may be allocated into the second logical partition, and 40 inventory containers may be allocated into the third logical partition, according to a left-to-right orientation sequence, thus allocating inventory container positions in the inventory system into different logical partitions.

After a plurality of inventory containers and a plurality of inventory container positions are allocated into logical partitions, if an inventory container is allocated into a logical partition A, but the inventory container is currently not at an inventory container position in the logical partition A, but at an inventory container position in a logical partition B, the location of the inventory container may be not adjusted immediately according to a logical partitioning result; instead, after the inventory container is transferred by a robot to an operating position to carry out a picking operation and is returned, the inventory container is placed into the inventory container position in logical partition A according to a logical partitioning result. That is, there may be a certain time delay in matching inventory containers with inventory container positions in the logical partitions.

S1210d: based on distances from operating positions to the inventory container positions associated with the plurality of logical partitions, respectively, allocating operating positions located in the inventory system into a preset number of top-ranked logical partition(s) of the plurality of logical partitions in a sequence of near-to-far distances from the operating positions.

In this embodiment, there may be a plurality of operating positions in the inventory system, and based on the location relationship between the plurality of operating positions and the inventory container positions associated with the plurality of logical partitions, distances from different inventory container positions to a same operating position may be not same, and distances from different operating positions to a same inventory container position may also be not same. Thus, based on distances from each operating position to the inventory container positions associated with the plurality of logical partitions, an operating position located in the inventory system may be allocated into a logical partition at the shortest distance therefrom, to ensure that distances from the plurality of operating positions to the inventory container positions in the plurality of logical partitions are as short as possible. In this way, when a robot is controlled to transfer an inventory container at an inventory container position to an operating position, it can ensure that both the operating position and the inventory container belong to a same associated logical partition, thus ensuring that a distance between the operating position and the inventory container is as short as possible, thereby reducing a transfer distance for the robot.

In this embodiment, optionally, for each operating position located in the inventory system, distances from each operating position to the inventory container positions associated with the plurality of logical partitions are calculated, a logical partition associated with an inventory container position at the closest distance from the operating position located in the inventory system is determined from the logical partitions, and the operating position located in the inventory system is allocated into the logical partition at the closest distance. Optionally, for each operating position located in the inventory system, distances from each operating position to the inventory container positions associated with the plurality of logical partitions are calculated, the obtained plurality of distances are sequenced to determine a preset number of top-ranked logical partition(s) in a near-to-far distance sequence, and the operating position located in the inventory system is allocated into the preset number of top-ranked logical partition(s).

In this embodiment, optionally, based on distances from operating positions to the inventory container positions associated with the plurality of logical partitions, allocating an operating position located in the inventory system into a logical partition at the shortest distance therefrom includes: based on the location relationship between the plurality of inventory container positions associated with the plurality of logical partitions and the plurality of operating positions, calculating a first transport distance to the plurality of operating positions from each of the inventory container positions associated with the plurality of logical partitions, and calculating a second transport distance to the inventory container positions associated with the plurality of logical partitions from each operating position; and allocating the operating positions located in the inventory system into logical partitions closest thereto based on the first transport distance and the second transport distance.

S1220: when processing a target order, determining a logical partition to which the target order belongs from a plurality of logical partitions as a target logical partition, wherein one logical partition is associated with at least one operating position and a plurality of inventory containers, and at least one of a plurality of inventory containers associated with the target logical partition contains an item required for the target order.

In this embodiment, one logical partition may be associated with at least one operating position, and one logical partition may be associated with a plurality of inventory containers. The target order may contain required item information. At least one of a plurality of inventory containers associated with the target logical partition contains an item required for the target order. Exemplarily, using the inventory system shown in FIG. 1A as an example, referring to FIG. 1A, the inventory system may include operating positions in workstations 140, inventory containers in an inventory container zone 130, and robots 110. Each logical partition in the inventory system may be associated with at least one operating position located in a workstation 140, and each logical partition is associated with a plurality of inventory containers located in the inventory container zone 130. The inventory containers located in the inventory container zone 130 may be used for storing items.

S1230: assigning the target order to an operating position associated with the target logical partition as a target operating position.

In this embodiment, given that in the inventory system, each logical partition may be associated with at least one operating position, after the target logical partition to which the target order belongs is determined, there may be a plurality of operating positions associated with the target logical partition, and any operating position may be selected therefrom as a target operating position.

S1240: controlling a robot to transfer a target inventory container that contains an item required for the target order, among the plurality of inventory containers associated with the target logical partition, to the target operating position.

In this embodiment, after the target order is assigned to the target operating position associated with the target logical partition, a robot may be controlled to transfer a target inventory container (i.e., an inventory container that contains an item required for the target order, of the plurality of inventory containers associated with the target logical partition) to the target operating position. At the corresponding target operating position, a working person or automated equipment may grab the item required for the target order from the target inventory container and place the same into an order container to wait for packing. Of course, in addition to an item picking operation, item replenishment, item stock-taking and other task operations may also be performed.

By adopting the above technical solution of this embodiment, an item racking strategy in a warehouse area may be guided based on the obtained plurality of SKU clusters, logical partitioning of the warehouse area is implemented, and only specific types of items are stored in the plurality of logical partitions, thereby reducing the probability of a robot transferring an inventory container over a long distance, and reducing the average transfer distance for a robot to transfer an inventory container and improving the transfer efficiency.

In another application scenario solution of this embodiment, a detailed solution of determining an order wave-grouping mode based on an SKU clustering result is provided in this embodiment. Steps of determining an order wave-grouping mode based on an SKU clustering result provided in the embodiment of the present application may include:

based on the obtained plurality of SKU clusters, different orders corresponding to different SKUs contained in a same SKU cluster are combined into a same order wave task, so as to assign the order wave task to a same workstation (or called working position) to perform a picking task.

In this embodiment, using a first item and the second item in a same SKU cluster, a first order including the first item, and a second order including the second item as an example, after the plurality of SKU clusters are obtained, it can be seen from a clustering result between the first item and the second item that the first item and the second item are located in the same SKU cluster, and the first order and the second order may be grouped into a wave and assigned to a same workstation to perform a task.

An effect of using the above technical solution of this embodiment is that the first item and the second item are placed on a same inventory container, or on two adjacent inventory containers, and the workstation may hit and pick items from as few inventory containers as possible when processing the first order and the second order in a wave task, so the picking efficiency is improved, and the transfer times of inventory containers are reduced.

In yet another application scenario solution of this embodiment, a detailed solution of determining a shelf adjustment mode based on an SKU clustering result is provided in this embodiment. Steps of determining a shelf adjustment mode based on an SKU clustering result provided in the embodiment of the present application may include:

based on the obtained plurality of SKU clusters, placing a plurality of SKUs that are included in a same item class onto an inventory container that meets a preset distance condition; or based on the obtained plurality of SKU clusters, stripping a plurality of SKUs that are placed on an inventory container meeting a preset distance condition but are not included in a same SKU cluster.

In this embodiment, the inventory container for the preset distance condition is a same inventory container, or a plurality of inventory containers spaced from each other by a distance less than or equal to a preset distance threshold.

An effect of using the above technical solution of this embodiment is that, as item stock-in and stock-out operations in the warehouse are a real-time dynamic process, a clustering result of the plurality of SKUs may be used to provide guiding principles for inventory container adjustment, achieve timely location adjustment of warehouse inventory, and reduce the transfer distance and transfer efficiency for a robot transferring inventory containers.

In even another application scenario solution of this embodiment, a detailed solution of determining a cross-dock picking mode based on an SKU clustering result is provided in this embodiment. Steps of determining a cross-dock picking mode based on an SKU clustering result provided in the embodiment of the present application may include:

allocating a plurality of stores into different store groups based on coincidence degrees between SKUs contained in the plurality of SKU clusters and SKUs required for a plurality of store orders; and allocating a same sorting time period to a plurality of stores in a same store group, to perform an SKU sorting operation within the same sorting time period for the plurality of stores in the same store group.

In this embodiment, the idea of cross docking is to omit warehousing, and is generally applied to goods picking for stores, in which goods are distributed to stores regularly, and when there is need for distribution, goods are conveyed directly from a supplier (the conveyed goods are all bulk good placed on pallets), and then the goods are sorted based on stores and conveyed directly to the stores, without the need to store the goods in the warehouse for a long time waiting for distribution to stores, so the expense of using the warehouse is saved. Thus, the place area in a cross-dock picking scenario is very limited and is not as large as the warehouse.

In this embodiment, after a plurality of item classes are obtained, a plurality of stores may be allocated into different store groups based on coincidence degrees between items contained in the plurality of item classes and items required for a plurality of store orders, and a same sorting time period is assigned to a plurality of stores in a same store group, to perform an item picking operation within the same sorting time period for the plurality of stores in the same store group.

By adopting the above technical solution of this embodiment, a plurality of stores in a same store group may be arranged for sorting in a same time period. For example, a store 1 and a store 2 are both arranged for sorting in the morning. In this way, sorting is performed by using as few pallets as possible, and in the case where the place area for cross-dock picking is limited and can only accommodate a limited number of picking operating positions, goods sorting tasks may be performed for as many stores as possible.

Figure 13:
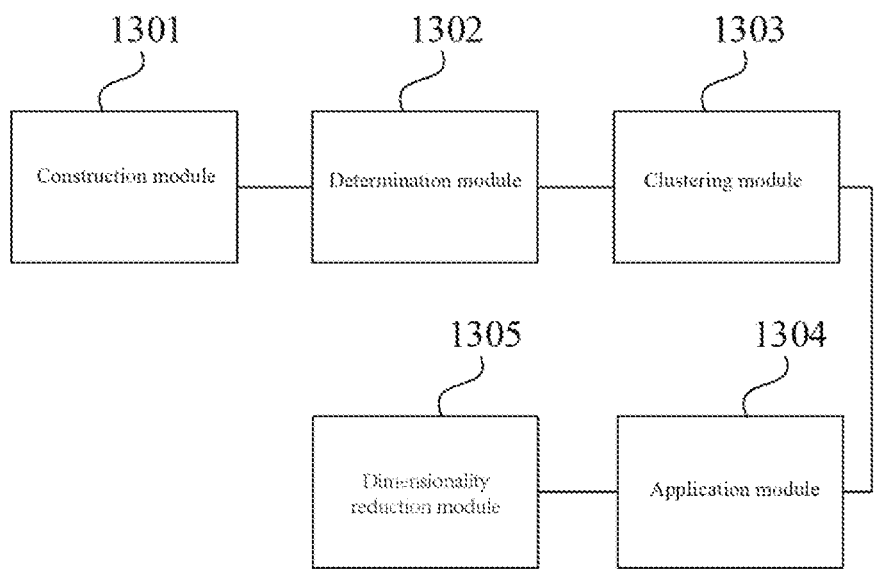
FIG. 13 is a structural diagram of another order processing apparatus provided in embodiments of the present application.

FIG. 13 is a structural diagram of yet another order processing apparatus provided in an embodiment of the present application. The embodiment of the present application may be applied to a scenario where SKUs are clustered according to SKU correlation. The apparatus may be implemented in software and/or hardware, and the apparatus may be integrated in multiple types of of devices with a network communication function.

As shown in FIG. 13, the order processing apparatus in the embodiment of the present application may further include: a construction module 1301, a determination module 1302, and a clustering module 1303, wherein;

the construction module 1301 is configured to map the SKUs into network nodes, and map a co-occurrence frequency of SKUs corresponding to any two of the network nodes in the historical orders into a correlation weight between the two network nodes, to construct an SKU correlation network of the SKUs;

the determination module 1302 is configured to determine eigenvalues of SKUs corresponding to a plurality of network nodes in the SKU correlation network respectively based on a graph embedding algorithm; and the clustering module 1303 is configured to cluster the plurality of SKUs based on the eigenvalues of the SKUs corresponding to the plurality of network nodes respectively to obtain a plurality of SKU clusters.

Based on the above embodiment, optionally, the apparatus may further include:

an application module 1304 configured to, based on the obtained plurality of item clusters, determine an SKU storage mode (or called goods storage mode), an order wave-grouping mode, a shelf adjustment mode and/or a cross-dock picking mode in the inventory system.

Based on the above embodiment, optionally, the application module 1304 may include:

a logical partitioning unit configured to divide the inventory system of the warehouse into a plurality of logical partitions based on the obtained plurality of SKU clusters.

Based on the above embodiment, optionally, the application module 1304 may include:

a logical partition determination sub-unit configured to determine the plurality of logical partitions based on the plurality of SKU clusters;

a first allocation sub-unit configured to, based on coincidence degrees between SKUs on inventory containers in the inventory system and SKUs in the plurality of SKU clusters, allocate inventory containers in the inventory system into a logical partition corresponding to a preset number of top-ranked SKU cluster(s) of the plurality of SKU clusters in a descending sequence of coincidence degrees with the SKUs on the inventory containers;

a second allocation sub-unit configured to allocate inventory container positions in the inventory system into different logical partitions, based on the numbers of inventory containers associated with the plurality of logical partitions, respectively; and a third allocation sub-unit configured to, based on distances from operating positions to the inventory container positions associated with the plurality of logical partitions, respectively, allocate operating positions located in the inventory system into a preset number of top-ranked logical partition(s) of the plurality of logical partitions in a sequence of near-to-far distances from the operating positions.

Based on the above embodiment, optionally, the order processing apparatus may include:

an order combination unit configured to, based on the obtained plurality of SKU clusters, combine different orders corresponding to different SKUs contained in a same SKU cluster into a same order wave task, so as to assign the order wave task to a same workstation (or called working position) to perform a picking task.

Based on the above embodiment, optionally, the order processing apparatus may further include:

a first shelf adjustment unit configured to, based on the obtained plurality of SKU clusters, place a plurality of SKUs that are included in a same SKU cluster onto an inventory container that meets a preset distance condition; or a second shelf adjustment unit configured to, based on the obtained plurality of SKU clusters, strip a plurality of SKUs that are placed on an inventory container meeting a preset distance condition but are not included in a same SKU cluster.

Based on the above embodiment, optionally, the inventory container for the preset distance condition is a same inventory container, or a plurality of inventory containers spaced from each other by a distance less than or equal to a preset distance threshold.

Based on the above embodiment, optionally, the order processing apparatus may include:

a store allocation unit configure to allocate a plurality of stores into different store groups based on coincidence degrees between SKUs contained in the plurality of SKU clusters and SKUs required for a plurality of store orders; and a sorting time allocation unit configured to allocate a same sorting time period to a plurality of stores in a same store group, to perform an SKU picking operation within the same sorting time period for the plurality of stores in the same store group.

Based on the above embodiment, optionally, the apparatus may further include:

a dimensionality reduction module 1305 configure to, using one eigenvalue as one dimension, perform dimensionality reduction on the eigenvalues of the SKUs corresponding to the plurality of network nodes in the SKU correlation network respectively.

Based on the above embodiment, optionally, the determination module 1302 may include:

an eigenvalue determination unit configured to calculate the eigenvalues of the SKUs corresponding to the plurality of network nodes in the SKU correlation network by using a DeepWalk algorithm or a large-scale information network embedding algorithm.

Based on the above embodiment, optionally, the eigenvalue determination unit is configured to:

for each random walk, uniformly at random sample a network node from the SKU correlation network as a starting point of the random walk, and during the walk, uniformly at random sample a neighboring point with a correlation weight from the previous accessed node until the walk reaches a preset maximum length to end the random walk, to obtain a plurality of node sequences; and train the plurality of node sequences by machine learning to obtain feature vectors of the SKUs corresponding to the plurality of network nodes respectively.

Based on the above embodiment, optionally, the eigenvalue determination unit is configured to:

determine first-order similarity degrees between the plurality of network nodes in the SKU correlation network and optimize the first-order similarity degrees between the plurality of network nodes to obtain first feature vectors of the SKUs corresponding to the plurality of network nodes respectively;

determine second-order similarity degrees between the plurality of network nodes in the SKU correlation network and optimize the second-order similarity degrees between the plurality of network nodes to obtain second feature vectors of the SKUs corresponding to the plurality of network nodes respectively; and splice the first feature vectors and the second feature vectors to obtain feature vectors of the SKUs corresponding to the plurality of network nodes respectively.

Figure 14:
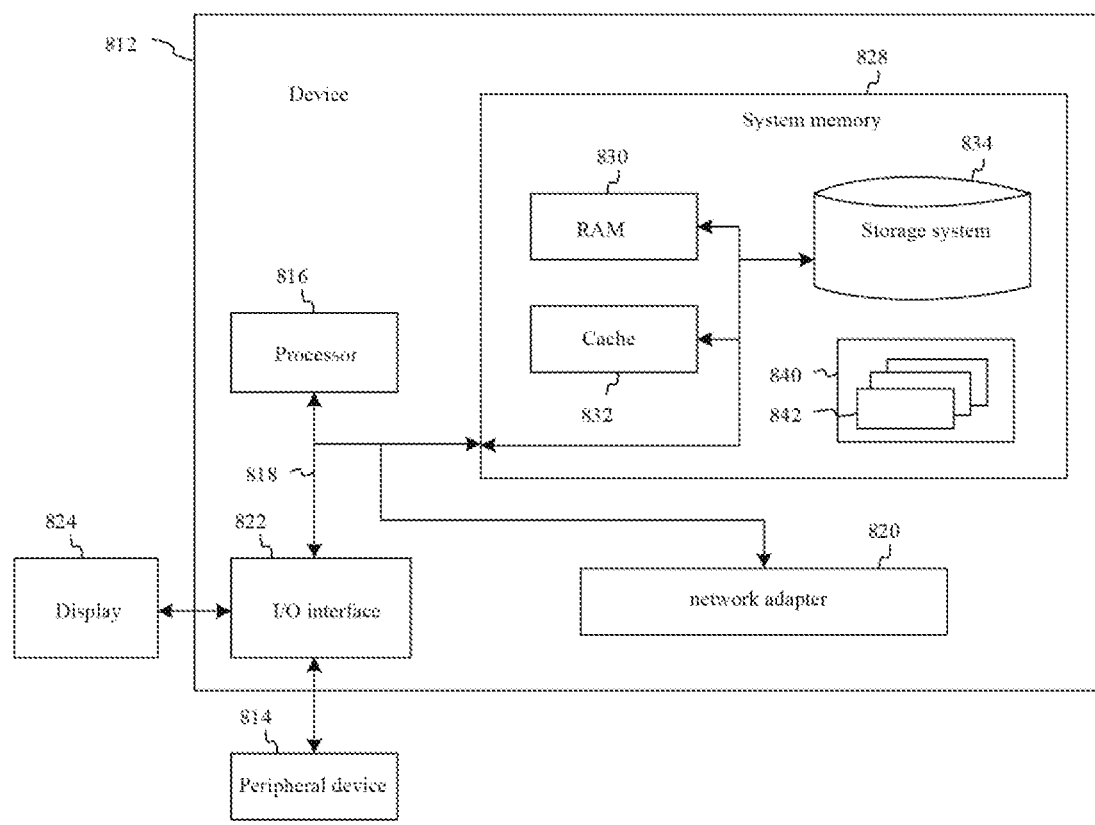
FIG. 14 is a structural diagram of another device provided in embodiments of the present application.

FIG. 14 is a structural diagram of a device provided in an embodiment of the present application. FIG. 14 shows a block diagram of an exemplary device 812 adapted to implement embodiments of the present application. The device 812 shown in FIG. 14 is only an example.

As shown in FIG. 14, the device 812 is embodied in the form of a general-purpose computing device. Components of the device 812 may include, but are not limited to, one or more processors or processing units 816, a system memory 828, and a bus 818 connecting different system components (including the system memory 828 and the processing unit 816).

The bus 818 represents one or more of several types of bus structures, including a memory bus or memory controller, a peripheral bus, an accelerated graphics port, a processor, or a local bus using any of multiple types of bus structures. For example, these architectures include, but are not limited to, an industry standard architecture (ISA) bus, a microchannel architecture (MAC) bus, an enhanced ISA bus, a video electronics standards association (VESA) local bus and a peripheral component interconnect (PCI) bus.

The device 812 includes multiple types of computer system readable media. These media may be various available media that can be accessed by the device 812, including volatile and non-volatile media, removable and non-removable media.

The system memory 828 may include a computer system readable medium in the form of a volatile memory, such as a random-access memory (RAM) 830 and/or a cache 832. The device 812 may further include other removable/non-removable, volatile/non-volatile computer system storage media. Only as an example, a storage system 834 may be configured to read from and write to a non-removable, non-volatile magnetic medium (not shown in FIG. 14, generally referred to as a "hard drive"). Although not shown in FIG. 14, a magnetic disc drive for reading from and writing to a removable non-volatile magnetic disc (such as a "floppy disc") and an optical disc drive for reading from and writing to a removable non-volatile optical disc (such as a portable compact disc read-only memory (CD-ROM), a digital video disc-read only memory (DVD-ROM) or other optical medium) may be provided. In these cases, each drive may be connected to the bus 818 through one or more data medium interfaces. The memory 828 can include at least one program product having a set of (for example, at least one) program modules, which are configured to perform functions of multiple embodiments of the present application.

A program/utility tool 840 having a set of (at least one) program modules 842 may be stored in, for example, the memory 828. Such program modules 842 includes an operating system, one or more application programs, other program modules and program data. Each or some combination of the examples may include an implementation of a network environment. The program modules 842 generally perform functions and/or methods in the embodiments described in the present application.

The device 812 may also communicate with one or more peripheral devices 814 (such as a keyboard, a pointing device, and a display 824), and may also communicate with one or more devices that enable a user to interact with the device 812, and/or communicate with various devices (such as a network card, and a modem) that enables the device 812 to communicate with one or more other computing devices. Such communication can be performed through an input/output (I/O) interface 822. In addition, the device 812 may also communicate with one or more networks (such as a local area network (LAN), a wide area network (WAN), and/or a public network such as the Internet) through a network adapter 820. As shown in FIG. 14, the network adapter 820 communicates with other modules of the device 812 through the bus 818. Although not shown in FIG. 14, other hardware and/or software modules may be used in conjunction with the device 812, including: microcodes, a device driver, a redundant processing unit, an external disc drive array, and a redundant arrays of independent drives (RAID) system, a magnetic tape drive, and a data backup storage system.

By running a program stored in the system memory 828, the processing unit 816 executes various functional applications and data processing, for example, implementing a method provided in an embodiment of the present invention, the method including:

determining a logical partition to which a target order belongs from a plurality of logical partitions as a target logical partition, wherein one logical partition is associated with at least one operating position and a plurality of inventory containers, and at least one of a plurality of inventory containers associated with the target logical partition contains an item required for the target order;

assigning the target order to an operating position associated with the target logical partition as a target operating position; and controlling a robot to transfer a target inventory container that contains an item required for the target order, among the plurality of inventory containers associated with the target logical partition, to the target operating position.

The method further includes:

mapping the SKUs into network nodes, and mapping a co-occurrence frequency of SKUs corresponding to any two of the network nodes in the historical orders into a correlation weight between the two network nodes, to construct an SKU correlation network of the SKUs;

determining eigenvalues of SKUs corresponding to a plurality of network nodes in the SKU correlation network respectively based on a graph embedding algorithm; and clustering the plurality of SKUs based on the eigenvalues of the SKUs corresponding to the plurality of network nodes respectively to obtain a plurality of SKU clusters.

In addition, an embodiment of the present application further provides a computer-readable storage medium, which stores a computer program that, when executed by a processor, is configured to perform an order processing method, the method including:

determining a logical partition to which a target order belongs from a plurality of logical partitions as a target logical partition, wherein one logical partition is associated with at least one operating position and a plurality of inventory containers, and at least one of a plurality of inventory containers associated with the target logical partition contains an item required for the target order;

assigning the target order to an operating position associated with the target logical partition as a target operating position; and controlling a robot to transfer a target inventory container that contains items required for the target order, of the plurality of inventory containers associated with the target logical partition, to the target operating position.

Optionally, the program, when executed by the processor, may also be configured to perform a method provided in any embodiment of the present application. From the above description of implementations, those skilled in the art may clearly understand that the present application may be implemented by means of software and general-purpose hardware, and may also be implemented by hardware. Based on this understanding, the technical solution of the present application may be embodied in the form of a software product.

In a storage medium containing computer-executable instructions provided in an embodiment of the present application, the computer-executable instructions are not limited to the operations of the method as described above, but may also perform the relevant operations in the method provided in any embodiment of the present application, and has the corresponding functions and effects.

The computer storage medium in the present application may be any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus or device, or any combination thereof. The computer-readable storage medium includes: an electrical connection with at one or more conducting wires, a portable computer disc, a hard disc, an RAM, a read-only memory (ROM), an erasable programmable ROM (EPROM) or flash memory, an optical fiber, a portable magnetic disk CD-ROM, an optical storage device, a magnetic storage device, or a suitable combination thereof, and contains a number of instructions to cause a computer device (which may be a personal computer, a server, a network device or the like) to execute the methods described in multiple embodiments of the present application. As used herein, a computer-readable storage medium may be various tangible media that contain or store a program that can be used by or in combination with an instruction execution system, apparatus or device.

The computer-readable signal medium may include a data signal propagated in a baseband or as part of a carrier wave, and the data signal carries computer-readable program codes. The data signal so propagated may take various forms, including but not limited to an electromagnetic signal, an optical signal, or any suitable combination thereof. The computer-readable signal medium may also be various computer-readable media other than a computer-readable storage medium, and the computer-readable medium may send, propagate or transmit a program for use by or in connection with an instruction execution system, apparatus or device.

The program codes included in the computer-readable medium may be transmitted by various appropriate media, including a wireless, wire, optical cable, or radio frequency (RF) medium, or any suitable combination thereof.

The computer program codes for performing the operations of the present application may be written in one or more programming languages or a combination thereof, the programming languages including an object-oriented programming language such as Java, Smalltalk, C++, or python, and also including a conventional procedural programming language, such as "C" or similar programming language. The program codes may be executed entirely on a user's computer, partly on a user's computer, as an independent software package, partly on a user's computer and partly on a remote computer, or entirely on a remote computer or server. In the case where a remote computer is involved, the remote computer may be connected to a user's computer through various networks, including an LAN or WAN, or may be connected to an external computer (such as being connected through the Internet from an Internet service provider).

What is claimed is:

1. An order processing method, comprising:
   determining, using at least one processor, a logical partition to which a target order belongs from a plurality of logical partitions as a target logical partition, wherein one logical partition is associated with at least one operating position and a plurality of inventory containers, and at least one of the plurality of inventory containers associated with the target logical partition contains an item required for the target order;
   assigning, using the at least one processor, the target order to an operating position associated with the target logical partition as a target operating position; and
   controlling, using the at least one processor, a robot to transfer a target inventory container that contains the item required for the target order, among the plurality of inventory containers associated with the target logical partition, to the target operating position,
   wherein before determining a logical partition to which a target order belongs from a plurality of logical partitions as a target logical partition, the method further comprises:
      collecting at least one order to be processed into a total order pool bound to an inventory system;
      determining, using the at least one processor, a logical partition for the at least one order to be processed in the total order pool; and
      based on the logical partition to which the at least one order to be processed in the total order pool belongs, allocating, using the at least one processor, the at least one order to be processed in the total order pool into a sub-order pool bound to the logical partition to which the at least one order to be processed belongs, wherein one logical partition is bound to one sub-order pool;
   determining, using the at least one processor, a logical partition to which the target order belongs from a plurality of logical partitions as the target logical partition comprises:
      taking, using the at least one processor, an order to be processed from the sub-order pool as the target order, and
      determining, using the at least one processor, a logical partition to which the target order belongs based on the logical partition bound to the sub-order pool; and
   clustering, based on orders for clustering, stock keeping unit, SKU, contained in the orders for clustering, and generating a plurality of SKU clusters based on a clustering result, the clustering comprising machine learning.

2. The method according to claim 1, further comprising:
   dividing the inventory system into the plurality of logical partitions, wherein in the inventory system, any inventory container belongs to a logical partition, and any operating position belongs to a logical partition.

3. The method according to claim 2, wherein any inventory container position in the inventory system belongs to a logical partition, and one logical partition is associated with a plurality of inventory container positions.

4. The method according to claim 2, wherein
   the orders for clustering comprise at least one of following types: historical orders processed by the inventory system, orders to be processed by the inventory system, and orders predicted for the inventory system; and
   wherein dividing the inventory system into the plurality of logical partitions comprises:
      determining the plurality of logical partitions based on the plurality of SKU clusters; based on coincidence degrees between SKUs of items on inventory containers and the plurality of SKU clusters, allocating inventory containers into a logical partition corresponding to a preset number of top-ranked SKU clusters of the plurality of SKU clusters in a descending sequence of coincidence degrees with the SKUs of the items on the inventory containers;
      allocating inventory container positions into different logical partitions, based on quantities of inventory containers associated with the plurality of logical partitions respectively; and based on distances from operating positions to the inventory container positions associated with the plurality of logical partitions respectively, allocating operating positions into a preset number of top-ranked logical partitions of the plurality of logical partitions in a sequence of near-to-far distances from the operating positions.

5. The method according to claim 4, wherein based on coincidence degrees between SKUs of items on the inventory containers and the plurality of SKU clusters respectively, allocating inventory containers in the inventory system into a logical partition corresponding to a preset number of top-ranked SKU clusters of the plurality of SKU clusters in a descending sequence of coincidence degrees with the SKUs of the items on the inventory containers comprises:
based on coincidence degrees between SKUs of items on the inventory containers and the plurality of SKU clusters respectively, allocating inventory containers into a logical partition corresponding to an SKU cluster with a highest coincidence degree with the SKUs of the items on the inventory containers, among the plurality of SKU clusters.

6. The method according to claim 2, wherein dividing the inventory system into the plurality of logical partitions comprises:
clustering inventory containers in the inventory system according to a preset rule, and generating a plurality of inventory container clusters based on a clustering result;
determining the plurality of logical partitions based on the plurality of inventory container clusters;
allocating inventory containers contained in the plurality of inventory container clusters into logical partitions corresponding to the inventory container clusters to which the inventory containers respectively belong;
allocating inventory container positions into different logical partitions, based on quantities of inventory containers associated respectively with the plurality of logical partitions; and
based on distances from operating positions to the inventory container positions associated respectively with the plurality of logical partitions, allocating operating positions into a preset number of top-ranked logical partitions of the plurality of logical partitions in a sequence of near-to-far distances from the operating positions.

7. The method according to claim 4, wherein based on distances from operating positions to the inventory container positions associated respectively with the plurality of logical partitions, allocating operating positions located in the inventory system into a preset number of top-ranked logical partitions of the plurality of logical partitions in a sequence of near-to-far distances from the operating positions comprises:
based on distances from operating positions to the inventory container positions associated respectively with the plurality of logical partitions, allocating operating positions into a logical partition at a shortest distance from the operating positions, among the plurality of logical partitions.

8. The method according to claim 4, wherein clustering, based on orders for clustering, SKUs contained in the orders for clustering comprises:
extracting, based on historical orders of the inventory system, features for each SKU contained in the historical orders, and determining correlation degrees between a plurality of SKUs according to extracted features; and
clustering the plurality of SKUs based on the correlation degrees between the plurality of SKUs to obtain a clustering result.

9. The method according to claim 4, wherein determining a logical partition to which a target order belongs from a plurality of logical partitions as a target logical partition comprises:
based on coincidence degrees between SKUs in the target order and the plurality of SKU clusters respectively, determining a logical partition corresponding to a preset number of top-ranked SKU clusters of the plurality of SKU clusters in a descending sequence of coincidence degrees with the SKUs in the target order, as the target logical partition.

10. The method according to claim 6, wherein determining a logical partition to which a target order belongs from a plurality of logical partitions as a target logical partition comprises:
based on coincidence degrees between SKUs in the target order and SKU clusters contained in the plurality of inventory container clusters respectively, determining a logical partition corresponding to a preset number of top-ranked SKU clusters in the plurality of inventory container clusters in a descending sequence of coincidence degrees with the SKUs in the target order, as the target logical partition, the SKU cluster contained in each inventory container cluster being a list of SKUs on inventory containers contained in the inventory container cluster.

11. The method according to claim 1, further comprising:
if an order capacity in the sub-order pool bound to the target logical partition is less than a preset capacity value, pushing the order to be processed in the total order pool into the sub-order pool bound to the target logical partition, to ensure that the order capacity in the sub-order pool bound to the target logical partition after the push is greater than or equal to the preset capacity value.

12. The method according to claim 1, wherein assigning the target order to an operating position associated with the target logical partition comprises:
when detecting that an operating position associated with the target logical partition triggers a task, assigning the order to be processed in the sub-order pool bound to the target logical partition to the operating position associated with the target logical partition.

13. The method according to claim 4, further comprising:
if SKUs of items on the inventory containers associated with the logical partition are detected to be inconsistent with SKUs in the SKU cluster associated with the logical partition, adjusting, across partitions, locations of inventory containers located in different logical partitions.

14. The method according to claim 4, wherein the clustering is performed at regular timing or regular batches.

15. The method according to claim 4, wherein clustering, based on orders for clustering, SKUs contained in the orders for clustering, and generating a plurality of SKU clusters based on a clustering result comprises:
mapping the SKUs into network nodes, and mapping a co-occurrence frequency of SKUs corresponding to any two of the network nodes in the historical orders into a correlation weight between the two network nodes, to construct an SKU correlation network between the SKUs;

determining eigenvalues of SKUs corresponding to a plurality of network nodes in the SKU correlation network respectively based on a graph embedding algorithm; and clustering the plurality of SKUs based on the eigenvalues of the SKUs corresponding to the plurality of network nodes respectively to obtain a plurality of SKU clusters.

16. The method according to claim 15, wherein after determining eigenvalues of SKUs corresponding to a plurality of network nodes in the SKU correlation network respectively based on a graph embedding algorithm, the method further comprises:

using one eigenvalue as one dimension, performing dimensionality reduction on the eigenvalues of the SKUs corresponding to the plurality of network nodes in the SKU correlation network respectively.

17. The method according to claim 15, wherein determining eigenvalues of SKUs corresponding to a plurality of network nodes in the SKU correlation network respectively based on a graph embedding algorithm comprises:

calculating the eigenvalues of the SKUs corresponding to the plurality of network nodes in the SKU correlation network respectively by using a DeepWalk algorithm or a large-scale information network embedding algorithm.

18. The method according to claim 17, wherein calculating the eigenvalues of the SKUs corresponding to the plurality of network nodes in the SKU correlation network respectively by using a DeepWalk algorithm comprises:

for each random walk, uniformly at random sampling a network node from the SKU correlation network as a starting point of the random walk, and during the walk, uniformly at random sampling a neighboring point with a correlation weight from a previous accessed node until the walk reaches a preset maximum length to end the random walk, to obtain a plurality of node sequences; and training the plurality of node sequences by the machine learning to obtain feature vectors of the SKUs corresponding to the plurality of network nodes respectively.

19. The method according to claim 17, wherein calculating the eigenvalues of the SKUs corresponding to the plurality of network nodes in the SKU correlation network respectively by using a large-scale information network embedding algorithm comprises:

determining first-order similarity degrees between the plurality of network nodes in the SKU correlation network and optimizing the first-order similarity degrees between the plurality of network nodes to obtain first feature vectors of the SKUs corresponding to the plurality of network nodes respectively; and determining second-order similarity degrees between the plurality of network nodes in the SKU correlation network and optimizing the second-order similarity degrees between the plurality of network nodes to obtain second feature vectors of the SKUs corresponding to the plurality of network nodes respectively; and splicing the first feature vectors and the second feature vectors to obtain feature vectors of the SKUs corresponding to the plurality of network nodes respectively.

20. A device, comprising:
one or more processors; and
storage configured to store one or more programs, wherein
the one or more programs are executed by the one or more processors to cause the one or more processors to implement an order processing method, wherein the method comprises:

determining, using the one or more processors, a logical partition to which a target order belongs from a plurality of logical partitions as a target logical partition, wherein one logical partition is associated with at least one operating position and a plurality of inventory containers, and at least one of the plurality of inventory containers associated with the target logical partition contains an item required for the target order;

assigning, using the one or more processors, the target order to an operating position associated with the target logical partition as a target operating position; and controlling, using the one or more processors, a robot to transfer a target inventory container that contains the item required for the target order, among the plurality of inventory containers associated with the target logical partition, to the target operating position, wherein before determining a logical partition to which a target order belongs from a plurality of logical partitions as a target logical partition, the method further comprises:

collecting at least one order to be processed into a total order pool bound to an inventory system;

determining, using the one or more processors, a logical partition for the at least one order to be processed in the total order pool; and based on the logical partition to which the at least one order to be processed in the total order pool belongs, allocating, using the one or more processors, the at least one order to be processed in the total order pool into a sub-order pool bound to the logical partition to which the at least one order to be processed belongs, wherein one logical partition is bound to one sub-order pool;

determining, using the one or more processors, a logical partition to which the target order belongs from a plurality of logical partitions as the target logical partition comprises:

taking, using the one or more processors, an order to be processed from the sub-order pool as the target order, and determining, using the one or more processors, a logical partition to which the target order belongs based on the logical partition bound to the sub-order pool; and clustering, based on orders for clustering, stock keeping unit, SKU, contained in the orders for clustering, and generating a plurality of SKU clusters based on a clustering result, the clustering comprising machine learning.

21. A non-transitory computer readable storage medium, wherein the non-transitory computer readable storage medium stores a computer program which, when executed by a processor, implements an order processing method, wherein the method comprises:

determining, using the processor, a logical partition to which a target order belongs from a plurality of logical partitions as a target logical partition, wherein one logical partition is associated with at least one operating position and a plurality of inventory containers, and at least one of the plurality of inventory containers associated with the target logical partition contains an item required for the target order;

assigning, using the processor, the target order to an operating position associated with the target logical partition as a target operating position; and controlling, using the processor, a robot to transfer a target inventory container that contains the item required for the target order, among the plurality of inventory containers associated with the target logical partition, to the target operating position, wherein before determining a logical partition to which a target order belongs from a plurality of logical partitions as a target logical partition, the method further comprises:

collecting, using the processor, at least one order to be processed into a total order pool bound to an inventory system;

determining, using the processor, a logical partition for the at least one order to be processed in the total order pool; and based on the logical partition to which the at least one order to be processed in the total order pool belongs, allocating, using the processor, the at least one order to be processed in the total order pool into a sub-order pool bound to the logical partition to which the at least one order to be processed belongs, wherein one logical partition is bound to one sub-order pool;

determining, using the processor, a logical partition to which the target order belongs from a plurality of logical partitions as the target logical partition comprises:

taking, using the processor, an order to be processed from the sub-order pool as the target order, and determining, using the processor, a logical partition to which the target order belongs based on the logical partition bound to the sub-order pool; and clustering, based on orders for clustering, stock keeping unit, SKU, contained in the orders for clustering, and generating a plurality of SKU clusters based on a clustering result, the clustering comprising machine learning.

* * * * *